(12) United States Patent
Fukushi et al.

(10) Patent No.: US 11,299,420 B2
(45) Date of Patent: Apr. 12, 2022

(54) GLASS ARTICLE

(71) Applicant: AGC Inc., Chiyoda-ku (JP)

(72) Inventors: Takanori Fukushi, Tokyo (JP); Satoshi Kanasugi, Tokyo (JP); Toru Ikeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 591 days.

(21) Appl. No.: 16/361,959

(22) Filed: Mar. 22, 2019

(65) Prior Publication Data
US 2019/0292095 A1    Sep. 26, 2019

(30) Foreign Application Priority Data

Mar. 23, 2018   (JP) .............................. JP2018-055900

(51) Int. Cl.
*C03C 15/00* (2006.01)
*C03B 23/025* (2006.01)
*B60R 11/02* (2006.01)

(52) U.S. Cl.
CPC .......... *C03C 15/00* (2013.01); *C03B 23/0252* (2013.01); *B60R 11/0229* (2013.01); *Y10T 428/24355* (2015.01)

(58) Field of Classification Search
CPC .............................................. Y10T 428/24355
See application file for complete search history.

(56) References Cited

U.S. PATENT DOCUMENTS

2017/0174562 A1 * 6/2017 Torii ...................... C03B 33/00
2018/0162091 A1   6/2018 Takeda et al.

FOREIGN PATENT DOCUMENTS

| WO | WO 2009/025289 A1 | 2/2009 |
| WO | WO 2015/133346 A1 | 9/2015 |
| WO | WO 2017/135261 A1 | 8/2017 |

* cited by examiner

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A glass article including a first main surface, a second main surface, and an end face, in which: the glass article includes an antiglare layer on the first main surface side; the antiglare layer has a glass transition point Tg of equal to or less than a glass transition point $Tg_0$ of the glass article at a center portion in a cross section along a thickness direction; and the first main surface has a protrusion diameter y (μm) that satisfies the relation (1) with respect to a 60° specular gloss (gloss value) x (%) of the first main surface, $y > -0.0245x + 3.65$ (1).

15 Claims, 12 Drawing Sheets

GLASS ARTICLE

TECHNICAL FIELD

The present invention relates to a glass article.

BACKGROUND ART

Conventional touch sensors, liquid-crystal panels, and the like employ glass sheets having an antiglare film or an antireflection film (such glass sheets are hereinafter referred to as front sheets) (see Patent Documents 1 and 2). The front sheet can attain both an improvement in visibility due to the antiglare or antireflection film and enhanced strength due to the use of the glass sheet. For this reason, such front sheets are expected to be used in display panels to be mounted in vehicles.

Patent Document 1: International Publication WO 2009/025289

Patent Document 2: International Publication WO 2015/133346

SUMMARY OF INVENTION

In the case of a vehicle-mounted display panel employing a front sheet, the user operates the tough sensor disposed behind the front sheet, through the front sheet. During the operation, the user touches the front sheet with a finger, a stylus, or the like. In the beginning of the use, the front sheet attains high visibility due to the antiglare film, antireflection film, or the like. However, a problem concerning wear resistance is supposed to arise in which the antiglare film or the like peels off as the display panel is continuously used, resulting in a decrease in visibility.

An object of the present invention is to provide a glass article which is excellent in terms of visibility such as antiglare property and has high wear resistance.

The present invention includes the following configurations.

[1] A glass article including a first main surface, a second main surface, and an end face, in which:

the glass article includes an antiglare layer on the first main surface side;

the antiglare layer has a glass transition point Tg of equal to or less than a glass transition point $Tg_0$ of the glass article at a center portion in a cross section along a thickness direction; and the first main surface has a protrusion diameter y (μm) that satisfies the relation (1) with respect to a 60° specular gloss (gloss value) x (%) of the first main surface, $$y > -0.0245x + 3.65 \tag{1}$$

in which the protrusion diameter y (μm) is determined by examining the first main surface with a laser microscope to obtain an XYZ data of a surface shape, obtaining an image from the XYZ data, subjecting the obtained image to a filtering with an image processing software to acquire a smoothed image, subtracting an XYZ data of the smoothed image from the XYZ data of the surface shape to obtain a profile, cutting the profile at a height of a bearing height+ 0.01 μm, converting a resultant protrusion section into a circle, and taking the diameter of the circle as the protrusion diameter y, and the 60° specular gloss (gloss value) x (%) is a value measured by the method described in JIS Z8741:1997 (ISO 2813:1994).

[2] The glass article according to [1], in which at least one of the first main surface and the second main surface includes a curved portion.

[3] The glass article according to [1] or [2], having a ratio $Z_1/Z_0$ of 0.9-1.1, in which Z is an atomic composition ratio of X/Si between Si and an element X selected from the group consisting of Al, B, Zr, and Ti, $Z_1$ is the atomic composition ratio Z in the antiglare layer, and $Z_0$ is the atomic composition ratio Z in the glass article at the center portion in the cross section along the thickness direction.

[4] The glass article according to any one of [1] to [3], having an alkali metal composition ratio represented by K/(Li+Na+K) in the antiglare layer being larger than an alkali metal composition ratio in the glass article at the center portion in the cross section along the thickness direction.

[5] The glass article according to any one of [1] to [4], in which the antiglare layer includes a fluorine atom (F) or a chlorine atom (Cl)

[6] The glass article according to any one of [1] to [5], in which the 60° specular gloss (gloss value) x (%) is 15% or more and 130% or less.

[7] The glass article according to any one of [1] to [6], including an aluminosilicate glass.

[8] The glass article according to any one of [1] to [7], in which the protrusion diameter y (μm) is 1.5 μm or more and 3.0 μm or less.

[9] The glass article according to any one of [1] to [8], in which the first main surface has a surface skewness Ssk of less than 0. [10] The glass article according to any one of [1] to [9], having a haze value of 0.1% or more and 50% or less.

[11] The glass article according to [10], having an in-plane standard deviation of the haze value of 0-10%.

[12] The glass article according to any one of [1] to [11], in which at least one of the first main surface and the second main surface includes a surface compression stress layer having a surface compression stress (CS) of 500 MPa or higher.

[13] The glass article according to any one of [1] to [12], in which the first main surface further includes a functional layer.

[14] The glass article according to [13], in which the functional layer is an antireflection treatment layer.

[15] The glass article according to [13], in which the functional layer is an antifouling treatment layer.

According to the present invention, a glass article which is excellent in terms of visibility, such as antiglare property, and has high wear resistance can be provided.

BRIEF DESCRIPTION OF DRAWINGS

FIG. 1A shows a shape where a glass substrate includes a curved portion and a flat portion, and FIG. 1B shows a shape where a whole of a glass substrate is constituted of a curved portion.

FIG. 2B is a cross-sectional view of FIG. 2A at the dotted line of A to A'.

FIG. 3A shows a shape where the glass article is constituted of a flat portion only, and FIG. 3B shows a shape where the glass article includes a curved portion and a flat portion.

FIG. 5A shows a shape where a whole of a glass member is constituted of a flat portion, and FIG. 5B shows a shape where a glass member includes a curved portion and a flat portion.

DESCRIPTION OF EMBODIMENTS

The following definitions of terms apply in the description.

The term "flat portion" means a portion having an average radius of curvature exceeding 5,000 mm.

The term "curved portion" means a portion having an average radius of curvature of 5,000 mm or less.

The term "a glass article at a center portion in a cross section along a thickness direction" means a center region in the cross section of the glass article along the thickness direction, and the center region is defined as having a range of 20% of the thickness of the glass article, from the center of the glass article in the thickness direction. The same can be applied to a glass sheet and a glass member.

Figure 1A:
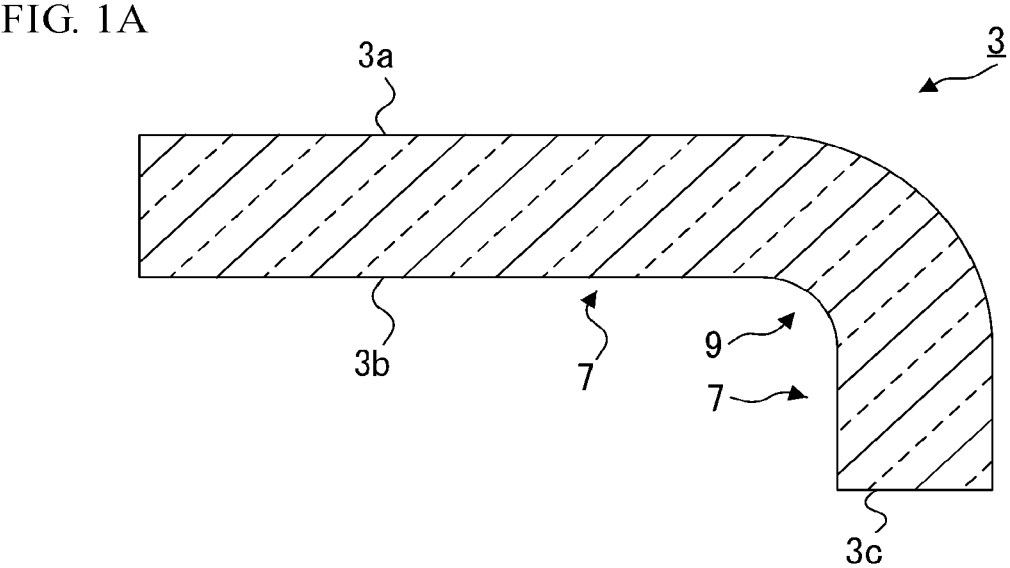
FIG. 1A and FIG. 1B are schematic cross-sectional views of curved sheets (glass substrates having a curved portion)
Figure 1B:
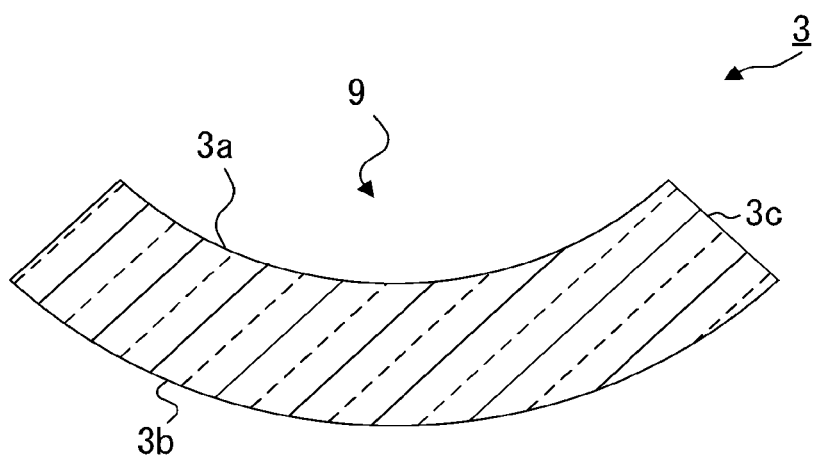

"A curved sheet (glass substrate 3 having a curved portion 9)" is a shape which, as illustrated by the schematic cross-sectional views of FIGS. 1A and 1B, has a first main surface 3a, a second main surface 3b, and an end face 3c and includes at least one curved portion 9. Examples thereof include a shape configured of a curved portion 9 and flat portions 7 in combination, as shown in FIG. 1A, and a shape which as a whole constitutes a curved portion 9, as shown in FIG. 1B. The shape thereof is not particularly limited so long as the curved sheet includes a curved portion 9.

Figure 2A:
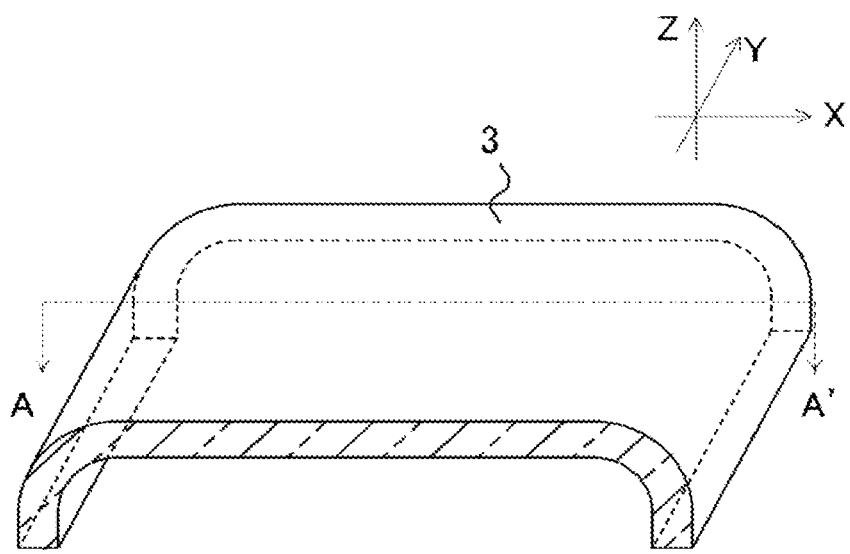
FIG. 2A and FIG. 2B are views which illustrate the bend depth of a curved sheet.
Figure 2B:
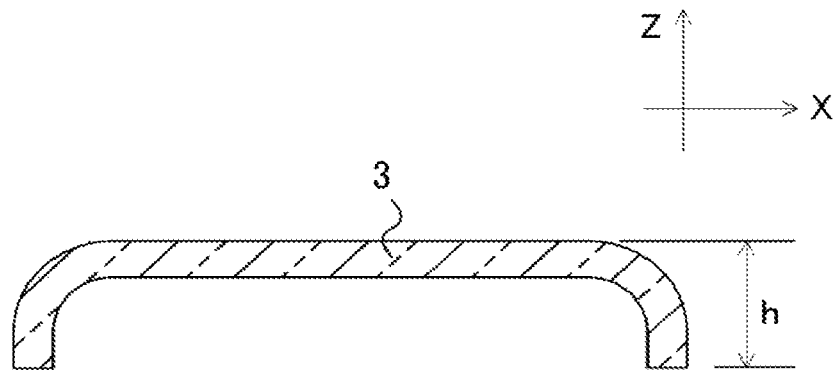

The term "bend depth" used for a curved sheet means the distance, in a thickness-direction cross-section of the curved sheet, between a straight line which connects the two ends of a main surface and a straight line that is parallel with the straight line and that is a tangent to the other main surface of the curved sheet. In a curved sheet as shown in FIGS. 2A and 2B, the distance h between both ends of the curved sheet along the bending direction (Z direction in FIGS. 2A and 2B) is the bend depth. In FIG. 2A, each flat surface is referred to as an XY surface. In FIG. 2B, each surface perpendicular to the bending direction (Z direction) is referred to as an XY surface.

The "arithmetic mean roughness Ra of a line" is determined in accordance with JIS B0601:2001 (ISO 4287:1997).

"Equilibrium viscosity" for a glass sheet indicates the viscosity of the composition of a glass sheet at a center portion in a cross section along a thickness direction. The equilibrium viscosity is measured by a beam bending method (ISO 7884-4:1987) or a fiber drawing method (ISO 7884-3:1987) or measured with a parallel sheet viscometer (ASTM C 338-93:2003) or a rod sedimentation viscometer (ISO 7884-5:1987), in accordance with the range of viscosities to be measured. In embodiments of the present invention, equilibrium viscosity is measured by the beam bending method (ISO 7884-4:1987).

"Haze value" is measured in accordance with JIS K 7136:2000 using a hazemeter (Type HR-100, manufactured by Murakami Color Research Laboratory Co., Ltd.).

"Bearing height" is determined by examining a region of 101 μm×135 μm to 111 μm×148 μm (hereinafter referred to also as examined region) with a laser microscope, analyzing the resultant data with an image processing software to obtain XYZ data of the surface shape of the examined region, determining a height distribution histogram from the XYZ data, and taking the most prominent height Z in the height distribution histogram as the bearing height. As the laser microscope, use can be made of VK-X100, manufactured by Keyence Corp. As the image processing software, is used SPIP manufactured by Image Metrology A/S. The height Z in the XYZ data is a height from a lowest point, as a base, in the examined region (the height Z is the length of a perpendicular drawn from the position where the height Z is to be measured to a plane which is parallel with the main surface, within the examined region, of the object being examined and which includes the lowest point). Hereinafter, the height in a surface shape in the case where any base is not particularly specified has the same meaning. For calculating the bearing height, the number of bins of the histogram is set at 1,000.

The term "surface obtained by image processing" means a surface obtained, as stated above, by examining a surface with a laser microscope to obtain XYZ data of a surface shape, obtaining an image from the XYZ data, subjecting the obtained image to filtering with an image processing software to acquire a smoothed image, and subtracting XYZ data of the smoothed image from the XYZ data of the surface shape. As the image processing software, use is made of SPIP, manufactured by Image Metrology A/S. In the case where the substrate to be observed and examined with a laser microscope has a curved portion, peripheral portions of this substrate may be kept down with a jig to observe and examine this substrate in the flattened state with the laser microscope and acquire the XYZ data of a surface shape.

The operation with image processing software SPIP for obtaining the "surface obtained by image processing" can be performed specifically through the following steps (i) to (iv).

(i) The XYZ data of a surface shape of the actually examined antiglare layer are subjected to an inclination correction in the custom mode to obtain a surface shape image in which the bearing height has been corrected to 0.

(ii) The surface shape image in which the bearing height has been corrected to 0 is subjected to filtering under the conditions of: "convolution, smoothing, set at average"; and "kernel size, set at X=Y=31 and circle". Thus, thirty-one XY data pieces are subjected to filtering for Z averaging circle by unit of circle, thereby obtaining a surface shape image including gentle recesses and protrusions (hereinafter referred to also as "smoothed image").

(iii) "Particles" are detected using a threshold level of 0.01 μM from the surface shape image in which the bearing height has been corrected to 0. Thereafter, an image window measurement is made, in which "filter difference" is selected, "store holes in the shape" is performed and a post-processing for "smoothing the outline" at a filter size of 51 points is performed to obtain a post-processed surface shape image (hereinafter referred to also as "surface shape").

(iv) A "surface obtained by image processing" is obtained as the difference between the smoothed image and the surface shape.

The "custom mode" in (i) is the mode which is displayed when an inclination correction (flattening) is performed with SPIP, and specifically the following four operations are automatically performed.

(i-1) "Average profile fit method" is selected as an "entire-surface correction method", with the degree being 3.

(i-2) "Process step" is not selected.

(i-3) With respect to "correction of each line", "not performed" is selected.

(i-4) As a "Z offset method", "set bearing height at zero" is selected.

Through the inclination correction, a fit surface for the XYZ data of a surface shape obtained with the laser microscope is calculated from average profiles of X and Y. By subtracting the fit surface from the image, the overall inclination of the image and unnecessary bends are removed.

In the case where the kernel size is set at X=Y=31 and circle in (ii), a kernel which is a substitute for the circle and is an octagon that is inscribed in a square of 31×31 is set. In the filtering, a simple average of all the points within the kernel replaces the original data irrespective of the kernel shape. Furthermore, the filtering gives a smoothed image from which fine recesses and protrusions have been removed (averaged).

The averaging filter of SPIP, in the case of a 31×31 filter, is indicated by the following matrix operation.

With respect to XYZ for a certain point, 961 points surrounding that point are circularly extracted (in the order of increasing distance therefrom). The values of Z for the respective XY points are summed up, and the sum is divided by 961, the resultant quotient being a new value of Z in the XY coordinates. This calculation is conducted for each of all the points within the surface. The spacing between adjacent measuring points in each of the X and Y directions is 71 nm. Since this operation determines averages for all the points while adjacently shifting the measuring point one by one, no decrease in resolving power results.

$$C = \frac{1}{961} \begin{bmatrix} 1 & 1 & \ldots & 1 \\ \vdots & \vdots & & \vdots \\ 1 & 1 & \ldots & 1 \\ 1 & 1 & \ldots & 1 \end{bmatrix} \begin{matrix} Y \text{ direction} \\ 31 \text{ points} \end{matrix}$$
$$X \text{ direction 31 points}$$

The threshold level of 0.01 μm in (iii) indicates that particles (protrusions) having a height of 0.01 μm or larger are detected. The height is based on the bearing height.

In the post-processing, the expression "store holes in the shape" means an operation in which the area of any recess having a height of 0.01 μm or less present in the region of a detected particle is not counted in determining the area of the particle.

The expression "smoothing the outline" means an operation for removing noises from the outline of a particle.

The filter size indicates the degree of particle outline smoothing; the larger the value thereof, the closer the smoothed outline to a circle.

Namely, the surface shape obtained by the post-processing in (iii) is a surface shape in which noises have been removed from the data acquired by an actual measurement and the outline of the protrusions has been thus regulated. That surface shape can be regarded as the shape of a rugged surface including actual first protrusions.

In (iv), the smoothed image obtained in (ii) is subtracted from the surface shape image obtained in (i), thereby obtaining a "surface obtained by image processing".

In general, in the case of an undulating surface having protrusions distributed thereon, it is difficult to accurately determine the number and shapes of the protrusions. In the shape analysis described above, the smoothed image and the surface shape are superposed on each other and the protrusions lying above the surface of the smoothed image are regarded as protrusions distributed on a surface obtained by eliminating the undulations from the undulating surface.

The "protrusion diameter" is a diameter determined by cutting the "surface obtained by image processing" at a height of [bearing height]+0.01 μm to obtain sections of the protrusions, converting the sections into complete circles, and determining an average diameter thereof.

The "surface skewness (Ssk)" is a value which is obtained by analyzing, with image processing software SPIP, the data obtained by the examination with a laser microscope and which indicates the degree of symmetry of height distribution. The Ssk being less than 0 indicates that the surface has many fine valleys therein. The Ssk is calculated by a method according to ISO 25178:2010.

The "arithmetic mean roughness (Sa) of a surface" is obtained by analyzing, with image processing software SPIP, the data obtained by the examination with a laser microscope. This arithmetic mean roughness is a parameter obtained by extending Ra (arithmetic mean roughness of a line) to a surface, and represents an average of the absolute values of height differences between points on the surface and the corresponding points on a mean surface. The arithmetic mean roughness is calculated by a method according to ISO 25178:2010.

"Reflection image diffusiveness index R" is calculated by the following method. First, the surface of an object to be examined is taken as a reference (having an angle of) 0°, and the object to be examined is irradiated with light from a direction of +45° to measure the brightness of the regular-reflection light (45° regular-reflection light) which has been reflected on the surface of the object. Subsequently, the object being examined is likewise irradiated with light from a direction of +45°, and the brightness of all the light reflected on the surface of the object is measured while changing the light-receiving angle over the range of 0° to +90°. These measured values are substituted into the following equation to determine the reflection image diffusiveness index R.

Reflection image diffusiveness index R=[(brightness of all reflected light)−(brightness of 45° regular-reflection light)]/(brightness of all reflected light)

"Resolution index T" is calculated by the following method. An object to be examined, which has a first main surface and a second main surface, is irradiated with first light from the second-main-surface side along a direction parallel with the thickness direction of the object being examined (the parallel direction being referred to as "angle-0° direction"), and the brightness of the transmitted light which has passed through the first main surface and proceeds in the angle-0° direction (the transmitted light being referred to as "0°-transmitted light") is measured. Subsequently, the light-receiving angle with the first main surface is charged over the range of −90° to +90° to measure the brightness of all the transmitted light which is the first light having passed through the first main surface. These measured values are substituted into the following equation to determine the resolution index T.

Resolution index $T=[(\text{brightness of all transmitted light})-(\text{brightness of 0°-transmitted light})]/(\text{brightness of all transmitted light})$ "Sparkle index S" is determined in the following manner. An object to be examined, which has a first main surface and a second main surface, is disposed on an iPhone4 (registered trademark) (manufactured by Apple Inc.) having a pixel density of 326 ppi, so that the second main surface lies on the side facing the display surface of the iPhone4. Next, the screen is photographed from the first-main-surface side of the object to be examined, thereby acquiring an image. This image is analyzed with a software (trade name, EyeScale-4W; manufactured by I System Corp.), and the value of ISC-A outputted thereby is taken as the sparkle index S.

"60° specular gloss (gloss value)" is measured by the method described in JIS Z8741:1997 (ISO 2813:1994), using a gloss meter (MULTI GLOSS 268Plus, manufactured by Konica Minolta Inc.) without eliminating reflection occurring on the back surface (the surface on the side opposite from the side where a rugged structure has been formed).

Examples of the embodiment of the present invention are explained below in detain by reference to the drawings.

Figure 3A:
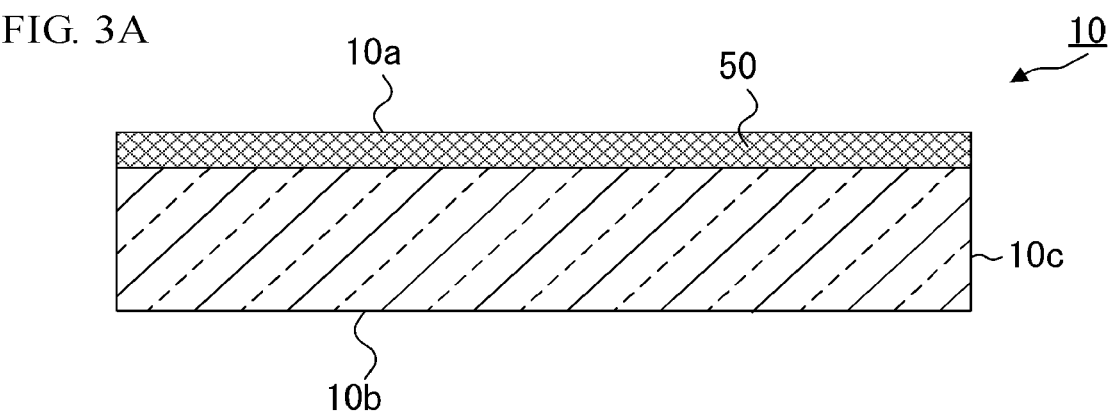
FIG. 3A and FIG. 3B are schematic cross-sectional views of glass articles.
Figure 3B:
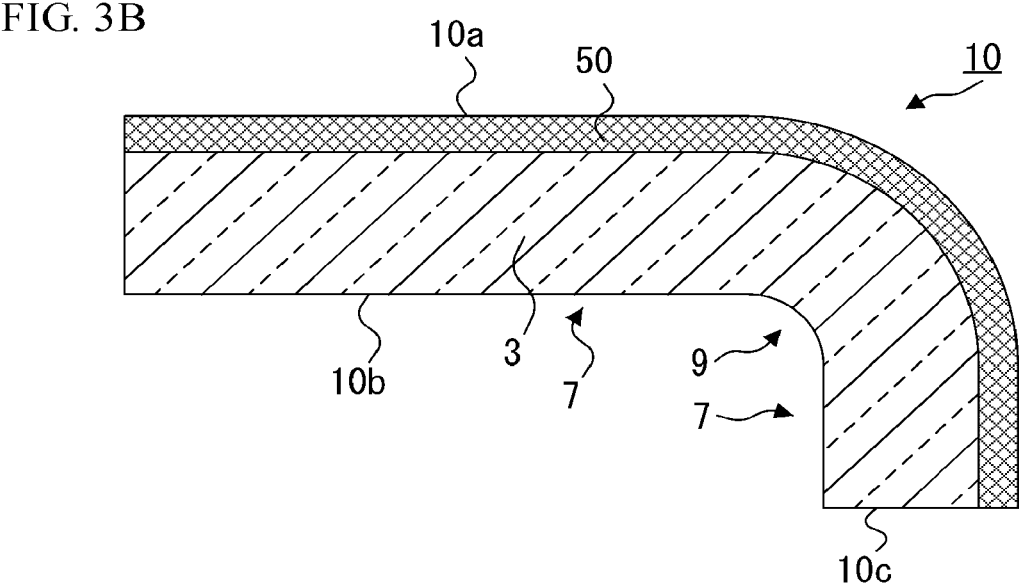

Glass Article 10:

FIGS. 3A and 3B show schematic sectional views of glass articles 10 as an examples of the present embodiments. The glass articles 10 each include a first main surface 10a, a second main surface 10b, and an end face 10c, in which the glass articles 10 each include an antiglare layer 50 on the first main surface 10a side, the antiglare layer 50 has a glass transition point Tg that is equal to or less than the glass transition point $Tg_0$ of the glass article 10 at a center portion in a cross section along a thickness direction, and the first main surface 10a has a protrusion diameter y (μm) that satisfies relation (1) with respect to a relation with 60° specular gloss (gloss value) x (%) of the first main surface 10a.

$$y > -0.0245x + 3.65 \quad (1)$$

The antiglare layer 50 is a layer in which the surface has a rugged shape to diffuse and reflect external light, thereby making the reflected images unclear and bringing about effects such as antiglare properties. The glass articles having the antiglare layer 50 are obtained, for example, by giving a heat treatment to a glass member having a rugged layer formed thereon, in the manner which will be described later.

The glass transition point Tg of the antiglare layer 50 is not higher than the glass transition point $Tg_0$ of the glass article 10 at the center portion in the cross section along the thickness direction. Due to this, in cases when, for example, a glass member having a rugged layer formed thereon is heat-treated, the antiglare layer 50 is less apt to crack and a glass article 10 having excellent optical properties and showing wear resistance can be obtained. The difference in glass transition point ($Tg_0-Tg$) is preferably larger than 0° C., more preferably 3° C. or larger, even more preferably 5° C. or larger, especially preferably 7° C. or larger. Although there is no particular upper limit on the difference in glass transition point ($Tg_0-Tg$), the difference therein is preferably 20° C. or less, more preferably 15° C. or less.

The antiglare layer 50 preferably has a softening point Tm which is not higher than the softening point $Tm_0$ of the glass article 10 at the center portion in the cross section along the thickness direction. Due to this, in cases when, for example, a glass member having a rugged layer formed thereon is heat-treated, the antiglare layer 50 is less apt to crack and a glass article 10 having excellent optical properties and showing wear resistance can be obtained. The difference in softening point ($Tm_0-Tm$) is preferably 3° C. or larger, more preferably 10° C. or larger, even more preferably 20° C. or larger. Although there is no particular upper limit on the difference in softening point ($Tm_0-Tm$), the difference therein is preferably 100° C. or less, more preferably 60° C. or less.

The glass transition point Tg is measured in accordance with JIS-R3103-3:2001 (Method of Transition Temperature Measurement by Thermal Expansion Method), and the softening point Tm is measured in accordance with JIS-R3103-1:2001 (Test Method for Softening Point of Glass). For measuring the glass transition point Tg, use can be made, for example, of a vertical thermodilatometer (Type DL-9500 (push rod type), manufactured by Shinku-Riko Inc.).

At least one of the main surfaces of the glass article 10 may have a curved portion. Various appliances (e.g., televisions, personal computers, smartphones, and vehicle-mounted displays) have recently come to employ image display devices in which the display screen and the cover glass therefor have a curved surface, and glass articles 10 including a curved portion are desired from the standpoint of appearance. In addition, since the touch panels and the like are also made to have a curved surface in accordance with the display screens of such image display devices, there is a desire for glass articles 10 including a curved portion, also from the standpoint of maintaining homogeneous sensitivity. In the case of imparting a curved portion to a glass article 10, this glass article 10 may be produced in accordance with the shape of the image display device, the shape of the housing of the image display device, etc.

In the glass article 10, the protrusion diameter y (μm) of the first main surface 10a satisfies relation (1) with respect to a relation with the 60° specular gloss (gloss value)×(%) of the first main surface 10a.

$$y > -0.0245x + 3.65 \quad (1)$$

(In relation (1), x represents the 60° specular gloss [unit, %] of the first main surface 10a, and y represents the protrusion diameter y [μm] of the first main surface 10a.)

The glass article 10, that satisfies relation (1), has a relatively large protrusion diameter when compared with respect to each value of gloss. This glass article hence is less apt to suffer concentration of stress due to friction when the surface of the glass article is rubbed, and has enhanced abrasion resistance.

The slope a of relation (1) is −0.0245 and indicates a change rate in protrusion diameter with a change in fluctuating gloss value. This indicates that the glass article 10 changes in protrusion diameter and in abrasion resistance as the gloss value changes. In general, the slope a has a negative value, and the slope a of relation (1) is preferably −0.0268 or larger. This is because the protrusion diameter can be kept large in a region where the gloss value is high (high-gloss region), and because it is hence advantageous to abrasion resistance.

The intercept b of relation (1) is 3.65 and indicates a virtual value of protrusion diameter in the glass article 10 in which the gloss value is the ideal value of 0. Meanwhile, since the glass article 10 has any of a wide variety of random surface structures, the virtual value (intercept b) of protrusion diameter in the glass article 10 in which the gloss value is the ideal value of 0 is not determined unconditionally. The intercept b of relation (1) is preferably 3.78 or larger, more preferably 3.88 or larger. This is because the larger the intercept, the larger the protrusion diameter can be kept in a low-gloss region and because larger intercept is advantageous to abrasion resistance.

The protrusion diameter y (μm) of the first main surface 10a of the glass article 10 preferably satisfies relation (1a), more preferably satisfies relation (1b).

$$y > -0.0268x + 3.78 \quad (1a)$$

$$y > -0.0268x + 3.88 \quad (1b)$$

The 60° specular gloss (gloss value) x of the outermost surface (the first main surface 10a) of the antiglare layer 50 of the glass article 10 is preferably 15% or more and 130% or less, more preferably 40% or more and 110% or less. Symbol x is an index to antiglare effect, and in cases when x is not larger than the upper limit, a sufficient antiglare effect is exhibited. In cases when x is not smaller than the lower limit, satisfactory transparency can be obtained to attain an improvement in visibility due to the transparency.

The glass article 10 preferably satisfies the following: when the atomic composition ratio X/Si between Si and an element X selected from the group consisting of Al, B, Zr, and Ti is expressed by Z, then the ratio $Z_1/Z_0$ between the atomic composition ratio $Z_1$ in the antiglare layer 50 and the atomic composition ratio $Z_0$ in the glass article 10 at the center portion in the cross section along the thickness direction is 0.9-1.1. In case where the ratio $Z_1/Z_0$ is outside the range, there is a large difference between the atomic composition in the antiglare layer 50 and the atomic composition in the glass article 10 at the center portion in the cross section along the thickness direction, resulting in different refractive indexes. This antiglare layer is prone to be an optically different layer whereby the glass article 10 appears to be heterogeneous. In cases when the ratio $Z_1/Z_0$ is regulated to a value within that range, the antiglare layer 50 is less apt to become an optically different layer even upon deposition of, for example, the antireflection layer which will be described later, and an excellent glass article 10 is obtained. The ratio $Z_1/Z_0$ is more preferably 0.95-1.05, even more preferably 0.95-1.03.

The glass article 10 preferably satisfies the following: the alkali metal composition ratio K/(Li+Na+K) (atomic composition ratio) is larger in the antiglare layer 50 than in the glass article 10 at the center portion in the cross section along the thickness direction. Due to this, not only the antiglare layer 50 of the glass article 10 has enhanced wear resistance but also the antiglare layer 50 can be made to have a lower refractive index than the glass article 10 at the center portion in the cross section along the thickness direction, enabling the glass article 10 to have an antireflection effect.

The antiglare layer 50 preferably contains a fluorine atom (F) or a chlorine atom (Cl), such as an inorganic fluoride or an inorganic chloride. Due to this, the antiglare layer 50 can have a lowered Tg. In addition, hydrophilicity is obtained by the inclusion thereof and, hence, fouling substances which have adhered to the outermost surface of the antiglare layer 50 are apt to be removed by water washing. In particular, inorganic fluorides are preferred because of the high hydrophilicity thereof. Especially preferred are inorganic fluorides of polyvalent cations such as Si, Al, Ca, or Mg.

As glasses suitable for the glass article 10, for example, alkali-free glasses, soda-lime glasses, soda-lime silicate glasses, aluminosilicate glasses, boron-silicate glasses, lithium-aluminosilicate glasses, and borosilicate glasses are usable. Aluminosilicate glasses and lithium-aluminosilicate glasses are preferred from the standpoint that such a glass, even when thin, is apt to be made to have high stress by a strengthening treatment, which will be described later, to give a high-strength glass, which is suitable for use as an article to be disposed on the viewing side of an image display device.

Examples of glass compositions include a glass which includes, in terms of oxide amount in % by mole, 50-80% of $SiO_2$, 0.1-25% of $Al_2O_3$, 3-30% in total of $Li_2O+Na_2O+K_2O$, 0-25% of MgO, 0-25% of CaO, and 0-5% of $ZrO_2$. However, the glass compositions are not particularly limited. More specific examples include the following glass compositions. For example, the expression "including 0-25% of MgO" means that MgO, although not essential, may be contained in an amount up to 25%. The composition of a glass article 10 is the composition of the glass article 10 at the center portion in the cross section along the thickness direction.

(i) A glass including, in terms of oxide amount in % by mole, 63-73% of $SiO_2$, 0.1-5.2% of $Al_2O_3$, 10-16% of $Na_2O$, 0-1.5% of $K_2O$, 0-5% of $Li_2O$, 5-13% of MgO, and 4-10% of CaO.
(ii) A glass including, in terms of oxide amount in % by mole, 50-74% of $SiO_2$, 1-10% of $Al_2O_3$, 6-14% of $Na_2O$, 3-11% of $K_2O$, 0-5% of $Li_2O$, 2-15% of MgO, 0-6% of CaO, and 0-5% of $ZrO_2$ and in which the total content of $SiO_2$ and $Al_2O_3$ is 75% or less, the total content of $Na_2O$ and $K_2O$ is 12-25%, and the total content of MgO and CaO is 7-15%.
(iii) A glass including, in terms of oxide amount in % by mole, 68-80% of $SiO_2$, 4-10% of $Al_2O_3$, 5-15% of $Na_2O$, 0-1% of $K_2O$, 0-5% of $Li_2O$, 4-15% of MgO, and 0-1% of $ZrO_2$.
(iv) A glass including, in terms of oxide amount in % by mole, 67-75% of $SiO_2$, 0-4% of $Al_2O_3$, 7-15% of $Na_2O$, 1-9% of $K_2O$, 0-5% of $Li_2O$, 6-14% of MgO, and 0-1.5% of $ZrO_2$ and in which the total content of $SiO_2$ and $Al_2O_3$ is 71-75%, the total content of $Na_2O$ and $K_2O$ is 12-20%, and the content of CaO, when CaO is contained, is less than 1%.
(v) A glass including, in terms of oxide amount in % by mole, 56-73% of $SiO_2$, 10-24% of $Al_2O_3$, 0-6% of $B_2O_3$, 0-6% of $P_2O_5$, 2-7% of $Li_2O$, 3-11% of $Na_2O$, 0-5% of $K_2O$, 0-8% of MgO, 0-2% of CaO, 0-5% of SrO, 0-5% of BaO, 0-5% of ZnO, 0-2% of $TiO_2$, and 0-4% of $ZrO_2$.

From the standpoint of appropriately performing the chemical strengthening which will be described later, the glass article 10 preferably has a glass composition in which the total content of $Li_2O$ and $Na_2O$ is 12% by mole or higher. As the content of $Li_2O$ in the glass composition increases, the glass transition point decreases to facilitate forming. The content of $Li_2O$ hence is preferably 0.5% by mole or higher, more preferably 1% by mole or higher, even more preferably 2% by mole or higher. Furthermore, from the standpoint of increasing the surface compressive stress (compressive stress; hereinafter often abbreviated to "CS") and the depth of the surface compressive stress layer (depth of layer; hereinafter often abbreviated to "DOL"), it is preferable that the glass composition includes 60% by mole or more of $SiO_2$ and 8% by mole or more of $Al_2O_3$.

In cases when the glass article 10 is to be colored and used, a colorant (coloring ingredient) may be added so long as the desired chemical strengthening property is not inhibited thereby. Examples of the colorant include oxides of metals which show absorption in the visible light region, such as Co, Mn, Fe, Ni, Cu, Cr, V, Bi, Se, Ti, Ce, Er, and Nd. Specific examples include $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$, and $Nd_2O_3$.

In the case of using a colored glass as the glass article 10, the glass may contain a coloring ingredient (at least one ingredient selected from the group consisting of oxides of metals which are Co, Mn, Fe, Ni, Cu, Cr, V, Bi, Se, Ti, Ce, Er, and Nd) in a total amount up to 7% in terms of oxide amount in % by mole. In case where the content of the coloring ingredient exceeds 7%, the glass is prone to devitrify. The content thereof is preferably 5% or less, more preferably 3% or less, even more preferably 1% or less. The glass substrate 3 may suitably contain $SO_3$, a chloride, a fluoride, or the like as a refining agent during melting.

A process for producing a glass substrate usable for a glass article 10 is explained below. First, raw materials for respective components are mixed so as to result in the composition described above, and the mixture is heated and melted with a glass melting furnace. The glass is homogenized by bubbling, stirring, addition of a refining agent, etc., and a glass sheet having a given thickness is formed therefrom by a known forming method and then annealed. Examples of the glass forming method include the float process, pressing process, fusion process, downdraw process, and rolling-out process. Especially preferred is the float process, which is suitable for mass production. Continuous forming methods other than the float process are also preferred, i.e., the fusion process and the downdraw process. The glass sheet formed into a flat shape by any desired forming method is annealed and then cut into a desired size, thereby obtaining a flat-sheet glass. In the case where, for example, higher dimensional accuracy is necessary, the glass sheet obtained by the cutting may be subjected to the grinding/polishing, end face processing, and boring which will be described later. This processing can inhibit the glass sheet from suffering cracking or chipping when handled in a heating step, etc., thereby improving the yield. The shape of the glass substrate is not limited to flat-sheet shapes, and the glass substrate may partially have a curved portion.

Thus, a glass article 10 having an antiglare layer 50 which includes protrusions, and having desired antiglare properties and excellent wear resistance is obtained.

Process for Producing Glass Article 10:

In a process for producing a glass article according to this embodiment, a glass member which includes a rugged layer and is an object to be heated is subjected to a heat treatment in which the glass member is heated to a temperature of, for example, 600° C. or higher so as to result in an equilibrium viscosity of about $10^{6.5}$-$10^{12.5}$ Pa·s. Specifically, the heat treatment is conducted in a forming step or an annealing step. By the heat treatment, the rugged layer of the glass member can be made to have a desired surface shape so as to yield a glass article showing excellent durability and optical properties.

In the following explanation, the object to be heated by a heat treatment is referred to as a "glass member", and the glass member which has undergone the heat treatment is referred to as a "glass article".

Figure 4:
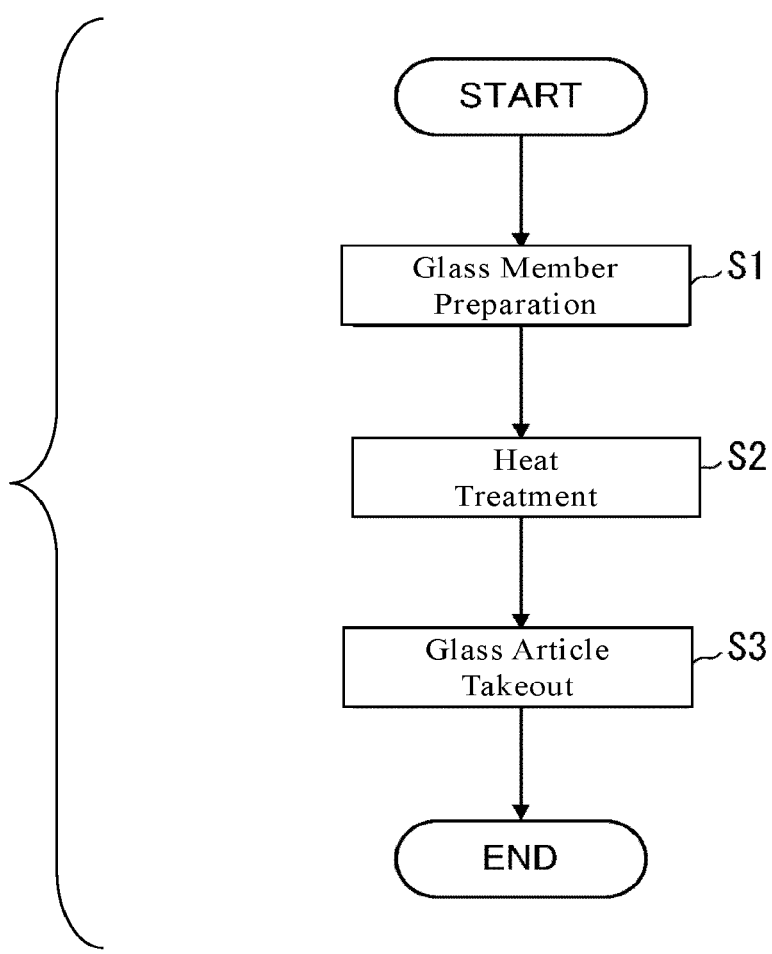
FIG. 4 is a flowchart which schematically shows an example of steps for producing a glass article through a heat treatment (S2).

FIG. 4 is a flowchart which schematically shows an example of steps for producing a glass article through a heat treatment.

In the steps for producing a glass article, a glass member is prepared first (glass member preparation; Si). After the glass member preparation (Si), a heat treatment such as a forming step or an annealing step is given to the glass member (heat treatment; S2), and a glass article is finally taken out (glass article takeout; S3).

Figure 5A:
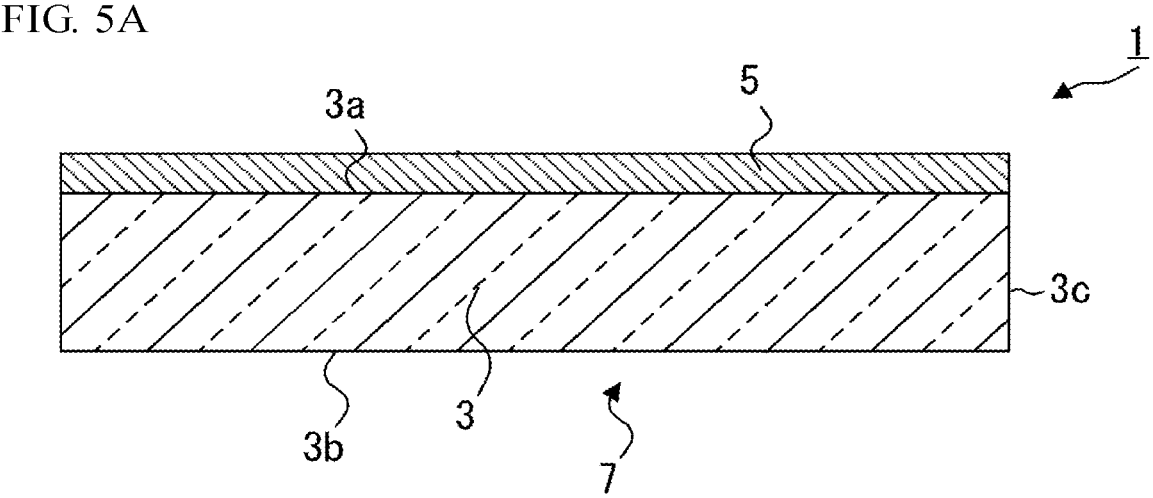
FIG. 5A and FIG. 5B are schematic cross-sectional views of glass members in each of which the first main surface has a rugged layer.
Figure 5B:
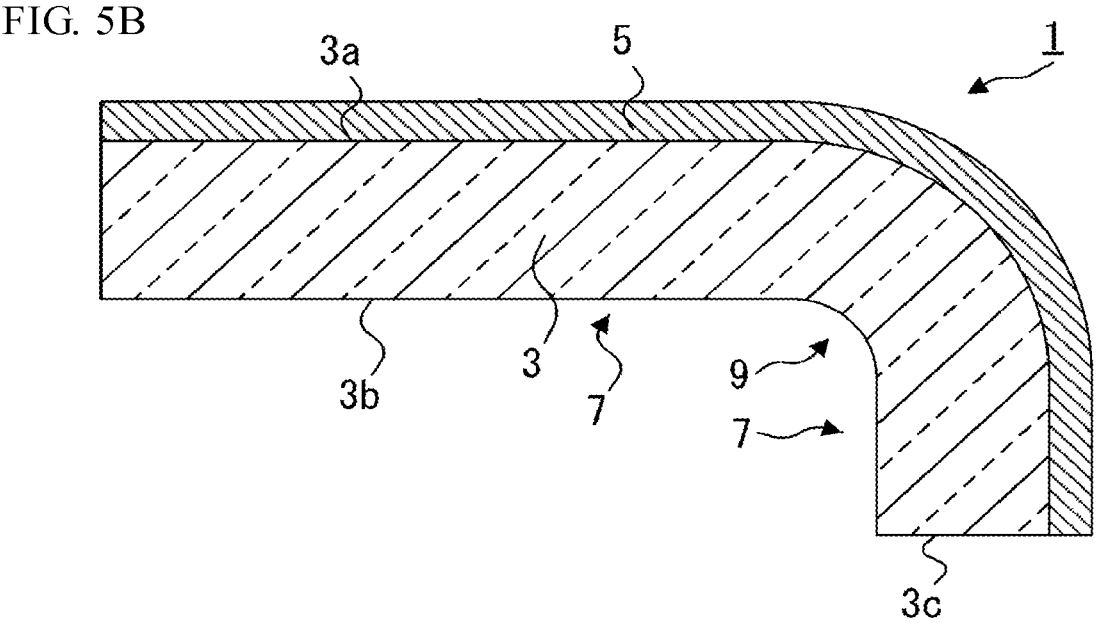

Glass Member Preparation; S1:

The glass member 1, as shown in FIG. 5A and FIG. 5B, includes: a glass substrate 3 having a first main surface 3a, a second main surface 3b, and an end face 3c; and a rugged layer 5 formed on at least one of the main surfaces. The shape of the glass member 1 is not particularly limited, and the glass member 1 may have a shape having an even thickness, such as a sheet shape, or have a shape which is uneven in thickness. As the glass substrate 3, any of the abovementioned glasses suitable for the glass article 10 can be used. A detailed explanation thereon is omitted.

Rugged Layer 5:

The rugged layer 5 is a layer which can be converted to an antiglare layer 50 of a desired shape by the heat treatment and which thereby brings about the effect of scattering reflected light to reduce the glare of reflected light due to light-source reflection in the surface. The rugged layer 5 may be formed by processing at least one main surface of the glass substrate 3 itself, or may be separately formed on at least one main surface by a deposition method. For forming the rugged layer, use can be made, for example, of a method in which at least a part of the glass substrate 3 is subjected to a surface treatment by a chemical or physical treatment to form a rugged shape having desired surface roughness. Alternatively, a rugged shape may be partially or wholly formed on at least one main surface of the glass substrate 3 by a deposition method, in which a processing liquid is applied or otherwise sprayed, or by a thermal treatment method such as forming.

Examples of the chemical treatment include a method in which etching (first etching treatment) is performed. The etching is conducted, for example, by immersing the glass substrate 3, which is an object to be treated, in a mixed solution of both hydrogen fluoride and ammonium fluoride, a mixed solution of both hydrogen fluoride and potassium fluoride, a mixed solution of both hydrogen fluoride and hydrogen chloride, etc.

Examples of the physical treatment include the so-called blasting, in which a powder of crystalline silicon dioxide or the like is blown with compressed air against at least one main surface of the glass substrate 3, and a method in which a brush to which a powder of crystalline silicon dioxide or the like has been applied is damped with water and then used to polish at least one main surface of the glass substrate 3.

Preferred of these is etching, which is a chemical treatment, because microcracks are less apt to generate in the surface being treated in the glass substrate 3 and a decrease in strength is less apt to result.

It is preferable that the glass substrate 3 which has undergone the first etching treatment is further subjected to a second etching treatment for regulating the surface shape of the rugged layer 5 of the glass substrate 3. As the second etching treatment, use can be made, for example, of a method in which the glass substrate 3 is immersed in an etching solution which is an aqueous solute of hydrogen fluoride. The etching solution may contain an acid, such as hydrochloric acid, nitric acid, or citric acid, besides hydrogen fluoride. The inclusion of any of these acids in the etching solution not only can inhibit the hydrogen fluoride from reacting with a cationic component contained in the glass, such as Na ions or K ions, and thereby locally yielding a precipitate, but also enables the etching to proceed evenly throughout the surface being treated.

In the case of conducting the first and second etching treatments, conditions such as the concentration of each etching solution and the period of immersion of the glass substrate 3 in each etching solution are regulated. Thus, the amount of glass to be removed by the etching from the glass substrate 3 is regulated to thereby form a rugged shape of a rugged layer 5 on the glass substrate 3 and to adjust the surface roughness to a desired value. In addition, although forming a rugged shape by a physical surface treatment such as blasting may result in cracking, the etching can remove such cracks.

It is preferable that the first and second etching treatments are conducted so that an inorganic fluoride or an inorganic chloride remains on the surface of the glass substrate 3, especially so that an inorganic fluoride of polyvalent cations, such as Si, Al, Ca, or Mg, is formed.

As the deposition method, use can be made, for example, of a known wet coating method (spray coating, electrostatic coating, spin coating, dip coating, die coating, curtain coating, screen coating, ink-jet printing, flow coating, gravure coating, bar coating, flexographic printing, slit coating, or roll coating).

The rugged layer 5 has a glass transition point (Tg) that is not higher than the glass transition point ($Tg_0$) of the glass member 1 at the center portion in the cross section along the thickness direction. Due to this, cracks are less apt to generate in the rugged layer 5 in the heat treatment (S2) which will be described later, thereby yielding a glass article 10 that has excellent optical properties and shoes wear resistance. In particular, even when load is imposed on the rugged layer 5 during heating for forming, etc. in the forming step (S2A) which will be described later, the rugged layer 5 can deform accordingly because of the flexibility thereof and can hence be inhibited from becoming uneven. As a result, a glass article 10 having an excellent appearance is obtained.

Heat Treatment; S2:

The heat treatment (S2) is conducted in order to produce a glass article 10 from the glass member 1, and examples thereof include a forming step (S2A) and an annealing step (S2B).

Figure 6:
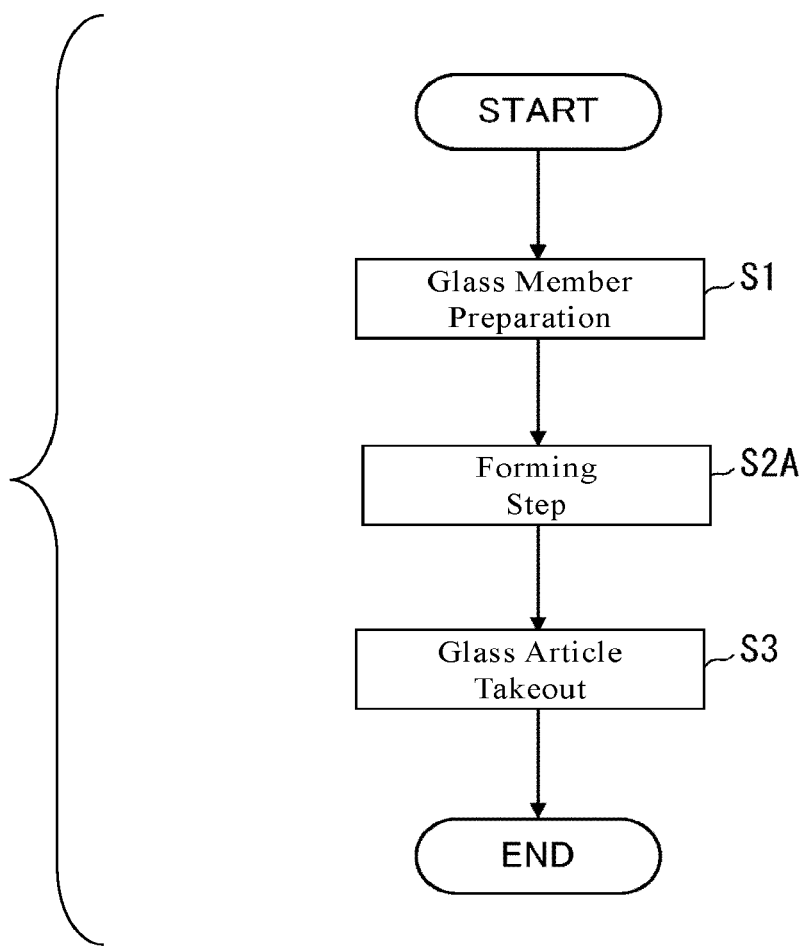
FIG. 6 is a flowchart which schematically shows an example of steps for producing a glass article through a forming step (S2A).
Figure 7:
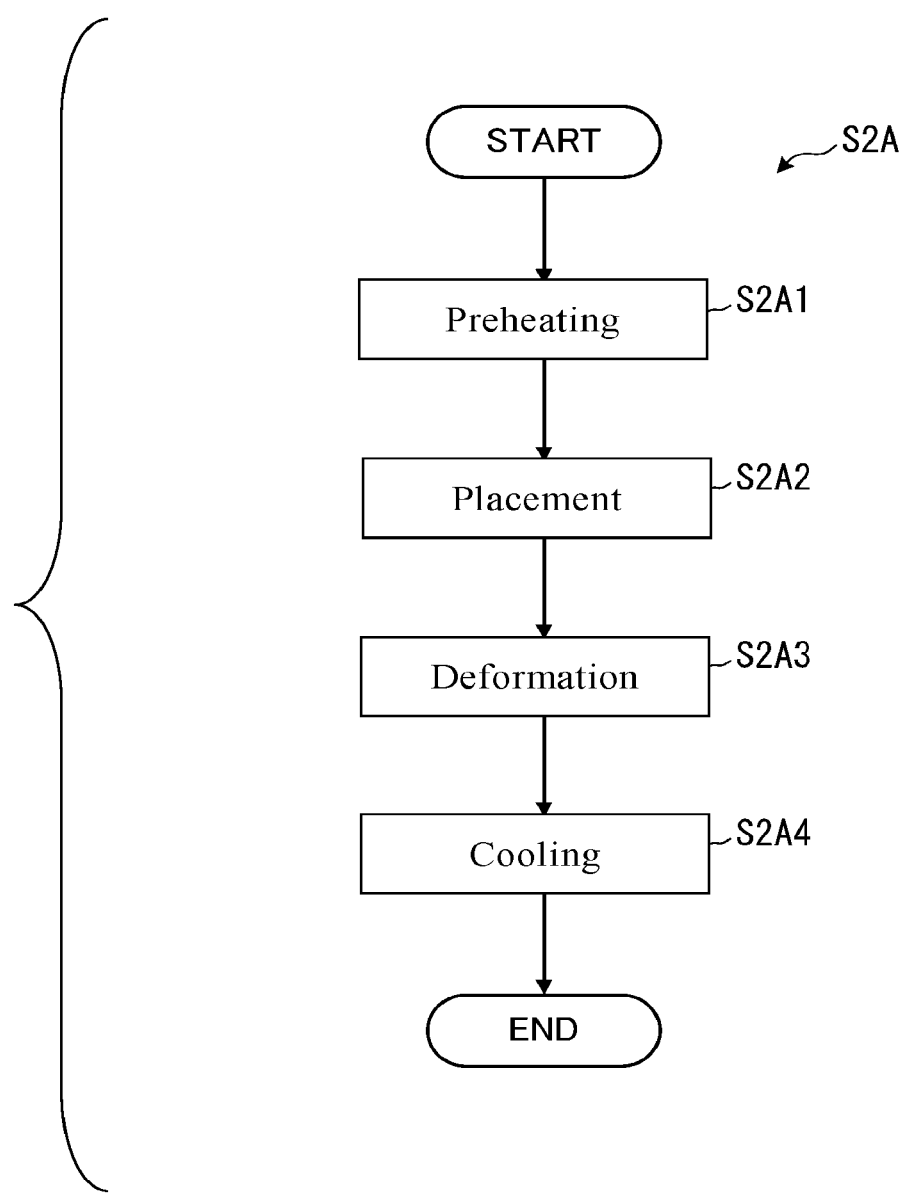
FIG. 7 is a flowchart which schematically shows an example of the forming step (S2A).

Forming Step; S2A:

FIG. 6 is a flowchart which schematically shows an example of production steps in which the heat treatment is conducted in a forming step (S2A). Performed in the forming step (S2A) are: preheating (S2A1), placement (S2A2) in which the glass member 1 is placed on a forming die or the like, deformation (S2A3) in which a desired shape is imparted to the glass member 1, and cooling (S2A4) in which the glass member 1 to which the desired shape has been imparted is cooled, as shown in FIG. 7. The order of these steps is not particularly limited. For example, the preheating may be conducted after the placement of the glass member 1. The glass member 1 may be made beforehand to be supported by a suitable supporting means, such as a supporting table, lower die, arm, etc., and thereby brought into a movable state.

Preheating; S2A1:

In the preheating (S2A1), the glass member 1 is heated to a temperature, e.g., about 500° C., which is lower than the softening point, so as to result in an equilibrium viscosity of $10^{12.5}$ Pa·s or more and $10^{17}$ Pa·s or less. Thus, the damages, e.g., cracks, which might occur when the glass member 1 is rapidly heated to around the softening point can be prevented from occurring.

Figure 8:
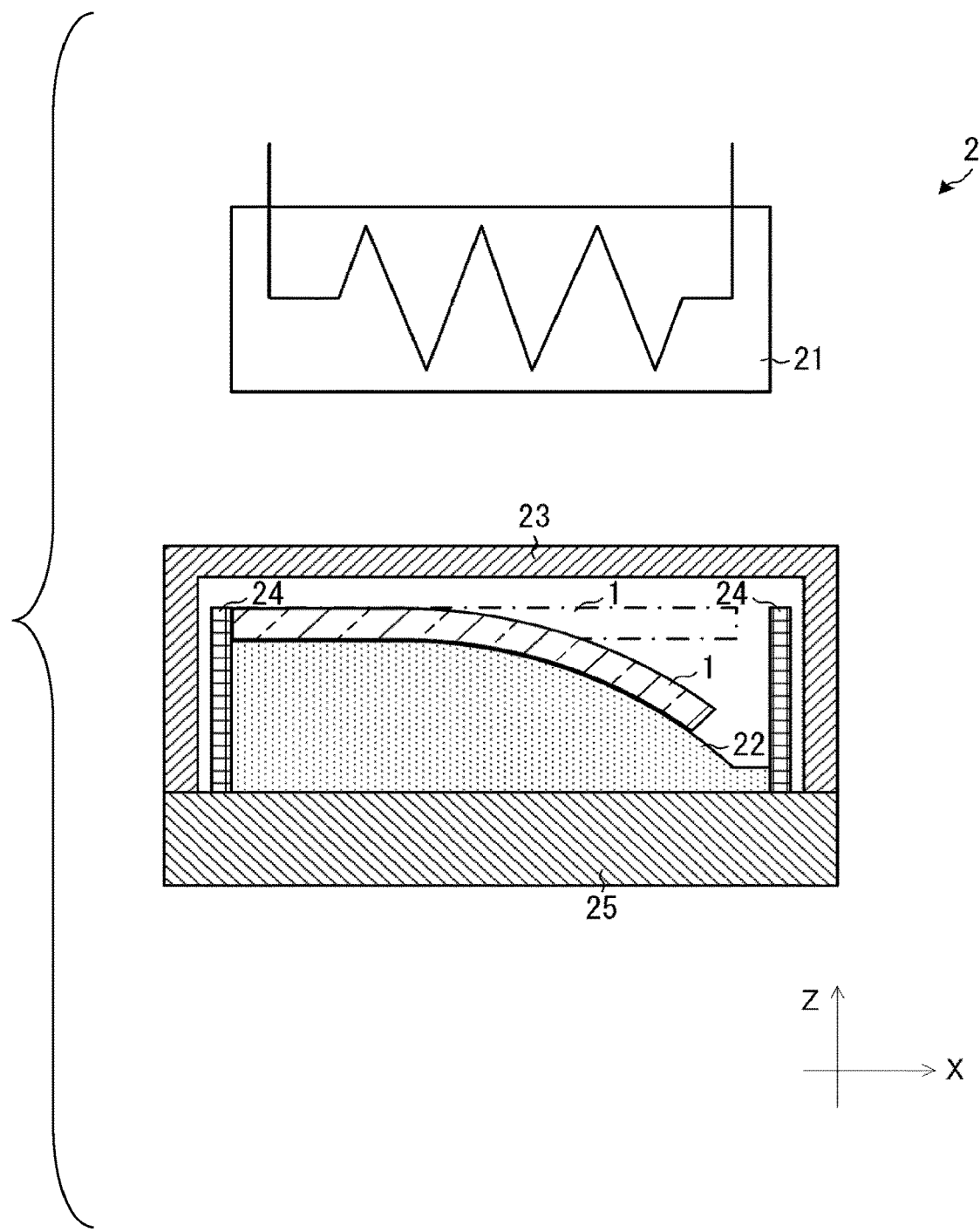
FIG. 8 is a schematic view showing a forming step in which a forming device is used.

Placement; S2A2:

In the placement (S2A2), the glass member 1 which has undergone the preheating (S2A1) is transferred to a forming device 2 as shown in FIG. 8. The forming device 2 includes a heater 21, a forming die 22, a cover 23, an outer die 24, and a base table 25. The glass member 1 is moved or conveyed to over the forming die 22 and placed thereon so that the forming die 22 comes into contact with one of the main surfaces of the glass member 1 or with an end face thereof. Thereafter, a preparation for forming is made according to need, for example, by surrounding the forming die 22 with the cover 23. Incidentally, the glass member 1 may be placed in the forming device 2 before being preheated, but the order thereof is not particularly limited.

The heater 21 is disposed, for example, over the cover 23 at a given distance therefrom. As the heater 21 can be used, for example, a radiation heater such as a sheathed heater, but the heater 21 is not particularly limited thereto. The heater 21 emits radiation heat from outside the cover 23 to heat the cover 23, and the glass member 1 disposed inside the cover 23 is indirectly heated by the heat accumulation in the cover 23, until the temperature of the glass member 1 rises to or above the softening point or until the glass member 1 comes to have an equilibrium viscosity of $10^{12.5}$ Pa·s or more and $10^{17}$ Pa·s or less.

The forming die 22 has a forming surface for forming the second main surface 3*b* of the glass member 1 into a desired shape. Namely, the forming surface of the forming die 22 has a design-bearing surface for obtaining a glass article 10 having a desired design. The material of the forming die 22 preferably is a metal sheet having oxidation resistance, such as stainless steel, or is a glass such as fused silica glass, a ceramic, or carbon. More preferred are glasses, such as fused silica glass, and carbon. Fused silica has high resistance to high temperatures and oxidative atmospheres and is less apt to cause defects to the glass member 1 in contact therewith, thereby yielding a glass article 10 having a surface with few flaws. Carbon has a high thermal conductivity to render efficient production of the glass article 10 possible. The forming surface of the forming die 22 may have a coating film of a metal, an oxide, carbon, etc.

The cover 23 for covering the forming die 22 is effective in keeping the surrounding of the forming die 22 clean. The cover 23 can be, for example, a metal sheet, e.g., stainless steel. The material of the cover 23 may be a glass, a glass ceramic, etc., and may be the same as that of the forming die 22.

The outer die 24 may be disposed so as to surround the periphery of the forming die 22, and may be used, for example, as a member which the glass member 1 is brought into contact with for positioning. The material of the outer die 24 may be the same as that of the forming die 22 or cover 23.

The base table 25 is for placing the forming die 22 on the top surface thereof. The base table 25 may have, formed inside thereof, a suction channel whereby the glass member 1 placed on the forming die 22 is vacuum-held to the forming surface. The material of the base table 25 can be a metal sheet, e.g., stainless steel, a glass, a ceramic, etc., and may be the same as that of the forming die 22 or cover 23.

Deformation; S2A3:

In the deformation (S2A3), the glass member 1 which has been placed on the forming die 22, etc. (S2A2) and disposed inside the cover 23 is heated with the heater 21 to a temperature, e.g., 700-750° C., not lower than the softening point so as to result in an equilibrium viscosity of $10^{6.5}$-$10^{12.5}$ Pa·s. The thus-heated glass member 1 is deformed by the deforming means which will be described later, and is thereby made to have a desired shape. Thus, a curved glass having a curved portion is, for example, obtained. In case where the equilibrium viscosity of the glass member 1 during the deformation is less than $10^{6.5}$ Pa·s, the rugged layer 5 formed on the glass member 1 is less apt to maintain the desired shape, making it difficult to control the optical properties of the glass article to be finally obtained. From the standpoint of finally obtaining a glass article 10 having satisfactory optical quality and a reduced deviation in shape from desired design dimensions, it is more preferable that the equilibrium viscosity is $10^7$-$10^{10}$ Pa·s. Temperature control is performed with respect to the surface of the glass member 1 which is not in contact with the forming die 22. It is preferable that the glass member 1 has the rugged layer 5 in the surface thereof which is not in contact with the forming die 22 and for which the temperature control is performed. The control of the temperature of the rugged layer 5, which has a low glass transition point Tg, facilitates formation of an excellent antiglare layer 50.

The deforming means can be selected from among a self-weight forming method, a pressure-difference forming method (vacuum forming method), a press forming method, etc., in accordance with the shape of a glass article 10 which is desired to be finally obtained.

The self-weight forming method is a method in which the glass member 1 is placed on a given forming die 22 according to the shape of the glass article 10 and is then softened to bend by means of gravitational force and conform to the forming die 22, thereby forming the glass member 1 into a given shape.

The pressure-difference forming method is a method in which the glass member 1 is softened and a pressure difference is given to the front and back surfaces of the glass member 1 in the softened state, thereby causing the glass member 1 to bend and conform to the die and thus forming the glass member 1 into a given shape. In a vacuum forming method, which is one mode of the pressure-difference forming method, the glass member 1 is placed on a forming die 22 having a design-bearing surface according to the shape of the glass article 10, and an upper die such as a clamp die is disposed on the glass member 1. Then, the surrounding of the glass member 1 is sealed. Thereafter, the space between the forming die 22 and the glass member 1 is depressurized with a pump to thereby give a pressure difference to the front and back surfaces of the glass member 1. In this operation, the upper-surface side of the glass member 1 may be pressurized in order to help the pressure-difference impartation.

The press forming method is a method in which the glass member 1 is disposed between two dies (a forming die 22 and an upper die) having design-bearing surfaces according to the shape of the glass article 10, and a pressing load is imposed to between the upper and lower dies, while keeping the glass member 1 in a softened state, thereby causing the glass member 1 to bend and conform to the dies and thus forming the glass member 1 into the given shape.

Of these methods, the vacuum forming method and the self-weight forming method are excellent methods for forming the glass member 1 into a given shape of the glass article 10 and are effective in diminishing recessed/protrudent defects such as scratches and dimples because the forming can be carried out while keeping one of the two main surfaces of the glass article 10 not in contact with the forming die. In addition, the self-weight forming method can inhibit the rugged layer 5 in the glass member 1 from suffering damage which prevents the rugged layer 5 from functioning, because the glass member 1 can be formed at a relatively low temperature.

Also usable besides these are a local-heating forming method, a pressure-difference forming method different from the vacuum forming method, etc. A suitable forming method may be selected in accordance with the shape of the glass article 10 to be obtained by the forming. Two or more forming methods may be used in combination.

The heating in the deformation preferably is radiation heating or convection heating.

Radiation heating is a technique in which an object to be heated absorbs energy emitted from a heat source, e.g., a heater, and is heated thereby. This heating technique can attain a reduction in heating-cooling cycle time in mass production of the glass article 10 and can hence attain a reduction in deformation tact time, resulting in an improvement in the efficiency of producing the glass article 10.

Convection heating is a technique in which an object to be heated is heated by the circulation of the surrounding gas. Due to this, the glass member 1 can have an even in-plane temperature distribution to facilitate structural control of the antiglare layer 50 in the glass article 10 to be finally obtained, resulting in an improvement in the efficiency of producing the glass article 10.

The glass article 10 thus obtained has a bend depth of preferably 1,000 mm or less, more preferably 500 mm or less, even more preferably 300 mm or less. Due to this, the rugged layer 5 is prevented from cracking, and a glass article including an antiglare layer 50 having desired properties is obtained as a final product.

The curved portion of the thus-obtained glass article 10 has an average radius of curvature of preferably 5 mm or more and 5,000 mm or less, more preferably 100 mm or more and 3,000 mm or less. Due to this, even when the forming step (S2A) is conducted so that load is imposed on the rugged layer 5, a glass article 10 having an excellent appearance is obtained in which the antiglare layer 50 has no unevenness.

Cooling; S2A4:

In the cooling (S2A4), cooling is conducted, after the deformation of the glass member 1 (S2A3), to a temperature at which handling is possible, such as room temperature, in order to take out the glass article 10 having an antiglare layer 50 obtained by changing the surface shape of the rugged layer 5.

After the forming step (S2A), the glass article takeout (S3) is conducted. Thus, a glass article 10 having a desired shape according to this embodiment is obtained. The rugged layer 5 has fine holes formed by etching or has pores remaining after burning for removing the solvent or organic substance used for forming the rugged layer 5 by deposition. These fine holes and pores are densified by the forming step (S2A) because the rugged layer 5 has a glass transition point Tg not higher than the glass transition point $Tg_0$ of the glass article 10 at the center portion in the cross section along the thickness direction and is hence easy to deform. The rugged layer 5 thus comes to show excellent abrasion resistance.

A general method may be one in which a glass substrate 3 is deformed and the resultant glass substrate having a curved portion is etched. However, the glass substrate thus obtained does not have abrasion resistance for the reason shown above. In addition, in the case where the glass substrate 3 which has been deformed and has a curved portion is etched, an even rugged layer 5 cannot be formed because of the complicated shape of the base material, and optical properties are not obtained. The glass article 10 obtained by the present invention has not only abrasion resistance but also excellent and homogeneous optical properties.

This glass article 10 may be subjected to the annealing step (S2B) which will be described below. In this case, it is only required that this glass article 10 be used as a glass member 1. In this case, the deformation (S2A3) may be followed by the annealing step (S2B) which will be described below, without conducting the cooling (S2A4).

Figure 9:
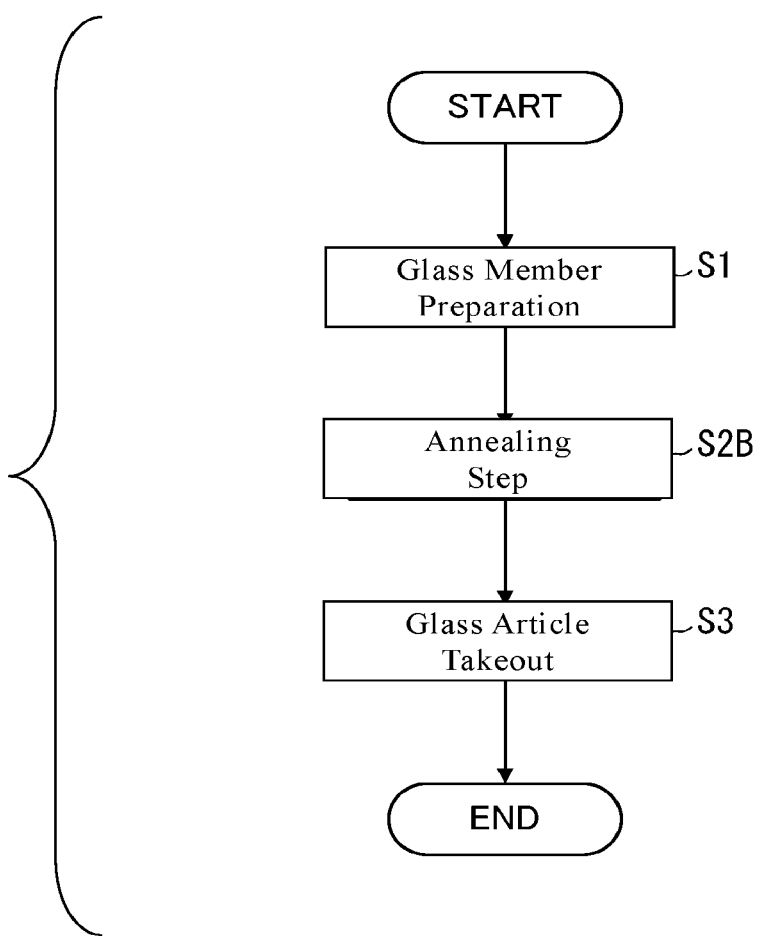
FIG. 9 is a flowchart which schematically shows an example of steps for producing a glass article through an annealing step (S2B).
Figure 10:
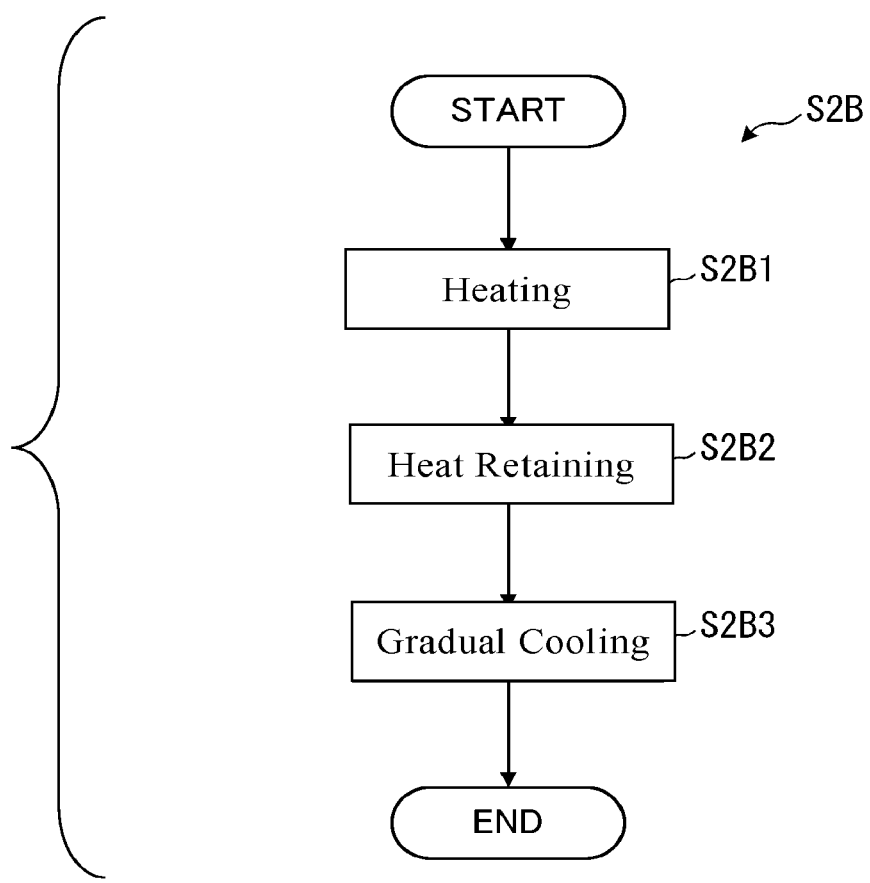
FIG. 10 is a flowchart which schematically shows an example of the annealing step (S2B).

Annealing Step; S2B:

FIG. 9 is a flowchart which schematically shows an example of production steps in which the heat treatment is conducted in an annealing step (S2B). Performed in the annealing step (S2B) are: heating (S2B1) to a desired temperature, heat retaining (S2B2) in which the glass member 1 is held at the desired temperature, and gradual cooling (S2B3) in which the glass member 1 which has undergone the heat retaining (S2B2) is gradually cooled, as shown in FIG. 10. The glass member 1 may be made beforehand to be supported by a suitable supporting means, such as a supporting table, forming die, or arm, and moved to a processing stage for each of the heating (S2B1), heat retaining (S2B2), and gradual cooling (S2B3).

The annealing has the effect of removing any strain and stress remaining in the glass member 1. In the case where a desired shape has been imparted to the glass member 1 in the forming step (S2A), large stress remains. In the case where the glass member 1 has residual stress, troubles may arise, such as, for example, unevenness in strengthening. Stress is prone to remain especially in large and thin glasses or in glasses having a complicated shape, which have been deformed into shapes suitable for the spaces in vehicles, such as the front sheets for use in vehicle-mounted display panels. The residual stress not only renders strengthening uneven, resulting in unevenness in strength, but also is prone to cause an optical strain. Annealing the glass member 1 can remove the residual strain to give a homogeneous glass.

As a method of heating in the annealing step, it is preferred to use radiation heating or convection heating. In cases when radiation heating is used, a reduction in heating-cooling cycle time can be attained in mass production of the glass article 10 and, hence, a reduction in tact time can be attained in the annealing step, resulting in an improvement in the efficiency of producing the glass article 10. In cases when convection heating is used, the glass member 1 can be made to have an even in-plane temperature distribution to finally yield a glass article 10 from which in-plane stress has been evenly removed. As a result, production of glass articles 10 which differ little from each other is rendered possible. Radiation heating and convection heating may be simultaneously used.

Figure 11:
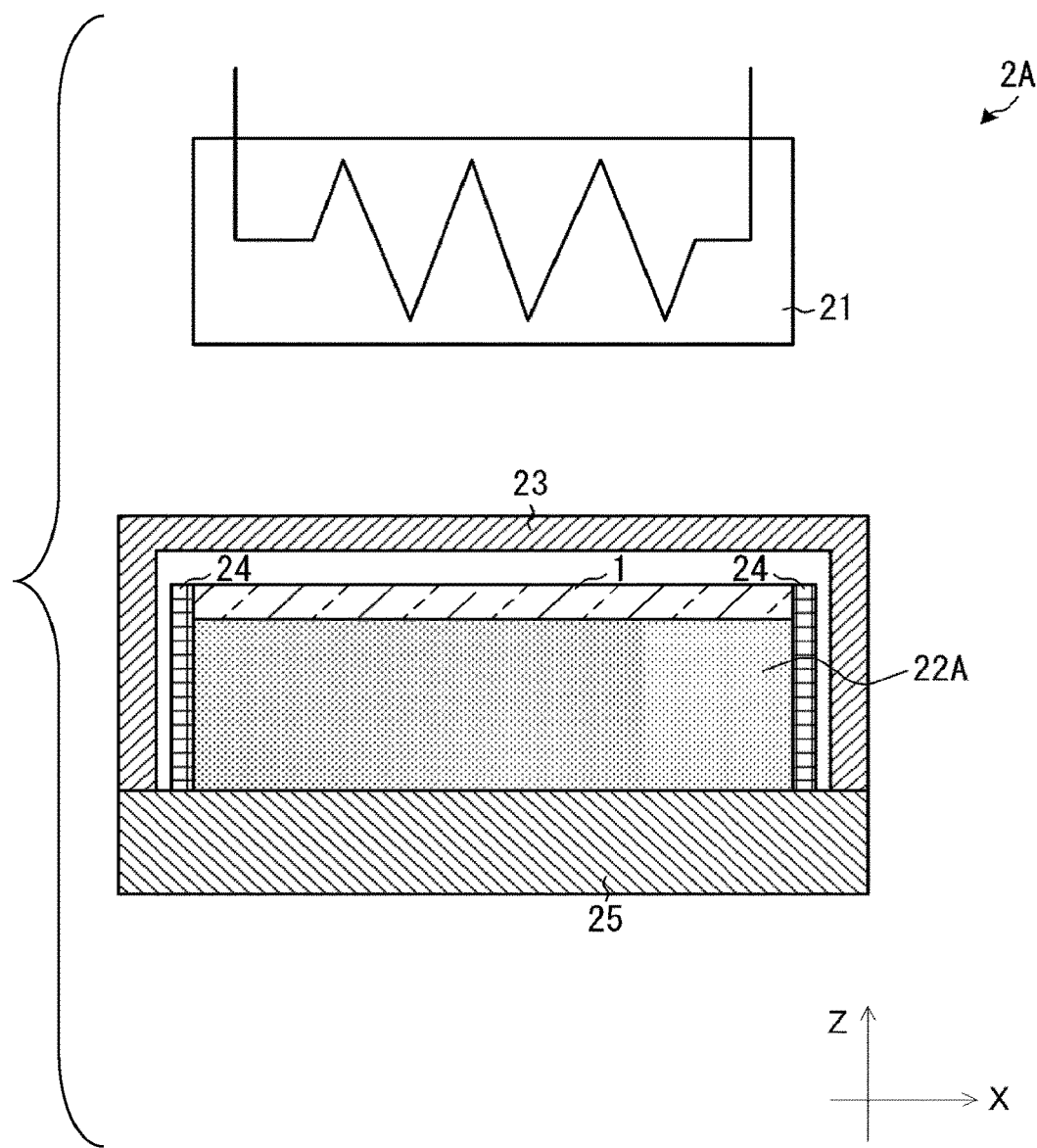
FIG. 11 is a schematic view showing a heating device for conducting forming or annealing.

In the annealing step (S2B), the glass member 1 is transferred to a heating device 2A as shown in FIG. 11. The heating device 2A includes a heater 21, a basal die 22A, a cover 23, an outer die 24, and a base table 25. The glass member 1 is moved or conveyed to over the basal die 22A and placed thereon so that the basal die 22A comes into contact with one of the main surfaces of the glass member 1 or with an end face thereof. Thereafter, a preparation for annealing is made according to need, for example, by surrounding the basal die 22A with the cover 23. Incidentally, the glass member 1 may be placed in the heating device 2A before being preheated, but the order thereof is not particularly limited.

The basal die 22A serves as a base for annealing the glass member 1. Namely, the outermost surface of the basal die 22A has a shape capable of supporting the glass member 1. The material of the basal die 22A preferably is a metal sheet having oxidation resistance, such as stainless steel, or is a glass such as fused silica glass, a ceramic, or carbon. More preferred are glasses, such as fused silica glass, and carbon. Fused silica has high resistance to high temperatures and oxidative atmospheres and is less apt to cause defects to the glass member 1 in contact therewith, thereby yielding a glass article 10 having a surface with few flaws. Carbon has a high thermal conductivity to render efficient production of the glass article 10 possible. The forming surface of the basal die 22A may have a coating film of a metal, an oxide, carbon, etc. A jig may be used in placing the glass member 1 on the basal die 22A. In this case, the material of the jig may be the same as that of the basal die 22A.

The cover 23, outer die 24, and base table 25 can have the same configurations as in the forming device 2 described above, and explanations thereon are omitted. Besides being used in the annealing step (S2B), the heating device 2A may be used as a forming device to conduct a forming step (S2A) in which a glass member 1 is placed on the basal die 22A which, for example, is slightly curved or has a pattern formed thereon.

Heating; S2B1:

In the heating, the glass member 1 is heated preferably so as to have an equilibrium viscosity of $10^{12.5}$-$10^{17}$ Pa·s. A desired annealing temperature in the annealing step is, for example, preferably about 550° C.

Heat Retaining; S2B2:

In the heat retaining, the glass member 1 heated to the annealing temperature is held preferably for, for example, 10-60 minutes. This is because the glass member 1 thus held can be cooled to room temperature while being inhibited from creeping. According to circumstances, the heat retaining may be conducted at a heat-retaining temperature set at a temperature lower than the temperature to which the glass member 1 was heated in the heating. The term "creeping" means a phenomenon in which, for example, the glass member 1 which has been heated and is held so as to have an equilibrium viscosity of $10^{12.5}$-$10^{17}$ Pa·s changes in shape with the lapse of time.

Gradual Cooling; S2B3:

In the gradual cooling, the temperature of the glass member is lowered at a rate of, for example, preferably 0.3-10° C./min, more preferably 0.3-5° C./min. This cooling rate prevents the glass member from having a temperature distribution therein, thereby inhibiting stress from remaining due to a temperature distribution. The gradual cooling is terminated, for example, at the time when the glass member is cooled to room temperature so as to result in the equilibrium viscosity of $10^{17.8}$ Pa·s or higher.

After the annealing step (S2B) is thus performed, the glass article takeout (S3) is conducted, thereby obtaining a glass article 10 according to this embodiment, to which a desired shape has been imparted.

According to the heat treatment (S2), the rugged layer 5 of the glass member changes slightly, giving an antiglare layer 50 having a high density. Usually, the rugged layer 5 formed in the glass member preparation (Si) has a low density. This is due to the fine holes formed by etching or due to the pores remaining after burning for removing the solvent or organic substance used for forming the rugged layer 5 by deposition. In cases when the glass having such a low-density rugged layer 5 is used, this glass shows insufficient durability in terms of wear resistance, because the rugged layer 5 is prone to wear. In cases when the heat treatment (S2) according to this embodiment is conducted, the density of the rugged layer 5 is improved because the rugged layer 5 has a glass transition point Tg not higher than the glass transition point $Tg_0$ of the glass article 10 at the center portion in the cross section along the thickness direction and is hence easy to deform. As a result, an antiglare layer 50 having durability in terms of wear resistance, etc. is obtained.

Applications:

Applications of the glass article 10 of the present invention are not particularly limited. Examples thereof include components for mounting on vehicles (headlamp covers, side view mirrors, front clear sheets, side clear sheets, rear clear sheets, instrument panel surfaces, the front sheets of displays for mounting on vehicles, etc.), meters, building windows, shown windows, interior members for buildings, exterior members for buildings, front sheets (notebook type personal computers, monitors, LCDs, PDPs, ELDs, CRTs, PDAs, etc.), LCD color filters, substrates for touch panels, pickup lenses, cover substrates for CCDs, transparent substrates (e.g., cover glasses) for solar cells, cell phone windows, components for organic EL elements, components for inorganic EL elements, components for fluorescent-substance luminescent elements, optical filters, illuminating lamps, the covers of illuminators, antireflection films, and polarizing films.

Modification Examples

The present invention should not be construed as being limited to the embodiments described above, and various improvements, design changes, etc. are possible unless such modifications depart from the spirit of the present invention. Specific procedures for carrying out the present invention, structures, etc. may be changed so long as the object of the present invention can be achieved.

The protrusion diameter (in terms of complete-circle diameter) of the outermost surface (the first main surface 10a) of the antiglare layer 50 is preferably 1.5 μm or more and 3.0 μm or less. Thus, the protrusions have high strength and, hence, the antiglare layer 50 can exhibit high wear resistance. The protrusion diameter (in terms of complete-circle diameter) thereof is more preferably 1.7 μm or more and 2.8 μm or less.

The outermost surface (the first main surface 10a) of the antiglare layer 50 preferably has a surface skewness Ssk less than 0. That the Ssk is less than 0 indicates that the surface of the antiglare layer 50 has recesses and protrusions having a spoon cut shape. In cases when the Ssk is as large as possible (as close to 0 as possible) within the range below 0, this indicates that the recesses and protrusions are gentle, and the antiglare layer 50 hence has improved wear resistance. The surface skewness Ssk is preferably −1.2 or larger but less than 0. This range of the surface skewness Ssk is more effective in attaining both optical properties and abrasion resistance.

The outermost surface (the first main surface 10a) of the antiglare layer 50 of the glass article 10 has an arithmetic mean line roughness Ra of preferably 0.03 μm or higher, more preferably 0.05 μm or higher and 0.7 μm or lower, even more preferably 0.07 μm or higher and 0.5 μm or lower. In cases when the arithmetic mean roughness Ra of the outermost surface of the antiglare layer 50 of the glass article 10 is not less than the lower limit, a sufficient antiglare effect is exhibited. In case where the Ra is not higher than the upper limit, image contrasts can be sufficiently inhibited from decreasing.

The outermost surface (the first main surface 10a) of the antiglare layer 50 of the glass article 10 has an arithmetic mean surface roughness Sa of preferably 0.09 μm or less, more preferably 0.06 μm or less. By regulating the Sa to a value not higher than the upper limit, the antiglare layer 50 is made to have improved wear resistance. The arithmetic mean surface roughness Sa of the outermost surface of the antiglare layer 50 is more preferably 0.01 μm or more and 0.09 μm or less, even more preferably 0.02 μm or more and 0.06 μm less. In case where the Sa is a large value, the outermost surface locally has an increased number of high protrusions and is prone to locally wear upon rubbing. This antiglare layer 50 hence has considerably poor abrasion resistance. The lower the gloss value, the more the Sa tends to increase. However, in cases when the gloss value is the same, smaller values of Sa are advantageous to abrasion resistance.

The outermost surface (the first main surface 10a) of the antiglare layer 50 of the glass article 10 has a maximum height roughness Rz of preferably 0.2 μm or more and 5 μm or less, more preferably 0.3 μm or more and 4.5 μm or less, even more preferably 0.5 μm or more and 4 μm or less. In cases when the maximum height roughness Rz of the outermost surface of the antiglare layer 50 of the glass article 10 is not less than the lower limit, a sufficient antiglare effect is exhibited. In cases when the Rz is not higher than the upper limit, image contrasts can be sufficiently inhibited from decreasing.

The glass article 10 has a haze value of preferably 0.1% or more and 50% or less, more preferably 0.1% or more and 30% or less, even more preferably 0.1% or more and 20% or less. In cases when the haze value of the glass article 10 is not less than the lower limit, an antiglare effect is exhibited. In cases when the haze value thereof is not higher than the upper limit, image contrasts can be sufficiently inhibited from decreasing in an image display device in which the glass article 10 has been disposed as the front panel or as any of various filters on the viewing side of the display.

In the case where the glass article 10 has a flat portion and a curved portion such as those shown in FIG. 3B, the ratio of reflection image diffusiveness indexes R [(reflection image diffusiveness index R of curved portion)/(sum of reflection image diffusiveness index R of flat portion and reflection image diffusiveness index R of curved portion)] is preferably 0.3-0.8, more preferably 0.4-0.7, even more preferably 0.4-0.6. In case where the glass article 10 has a high haze value, this glass article 10 looks more whitish due to light scattering and this is prone to result in shades or shadows, which affect evenness in visual appearance. In cases when the ratio of reflection image diffusiveness indexes R is within that range, evenness in visual appearance is less apt to be affected by shades or shadows and an excellent appearance is obtained.

The glass article 10 has an in-plane standard deviation of haze value of preferably 0-10%, more preferably 0-6%. In cases when the in-plane standard deviation of haze value thereof is within that range, the antiglare layer, when this glass article is viewed from the user side, can look homogeneous to provide an excellent appearance. In addition, the touch feeling owing to the rugged surface of the antiglare layer is not impaired. Furthermore, in cases when this glass article 10 is used as the front sheet of a display panel to be mounted in a vehicle, image homogeneity is obtained when the display panel is viewed from the driver seat and the display panel can be smoothly operated.

The glass article 10 has an in-plane standard deviation of sparkle index S of preferably 0-10%, more preferably 0-6%. In cases when the in-plane standard deviation of sparkle index S is within that range, use of this glass article 10 as the front sheet of a display panel to be mounted on a vehicle enables the display screen such as liquid-crystal to be viewed without giving an uncomfortable feeling. Consequently, image homogeneity is obtained when the display panel is viewed from the driver seat and the display panel can be smoothly operated.

The glass article 10 has an in-plane standard deviation of resolution index T of preferably 0-10%, more preferably 0-6%. In cases when the in-plane standard deviation of resolution index T is within that range, use of this glass article 10 as the front sheet of a display panel to be mounted on a vehicle enables the display screen such as liquid-crystal to be viewed without giving an uncomfortable feeling. Consequently, image homogeneity is obtained when the display panel is viewed from the driver seat and the display panel can be smoothly operated.

The glass member 1 and the glass article 10 (hereinafter each referred to as "work") may be subjected to the following steps and processing.

Grinding/Polishing

At least one main surface of the work may be ground and/or polished.

Boring:

A hole may be formed in at least a part of the work. The hole may or may not pierce the work. Boring may be conducted by machining using a drill, cutter, etc. or by etching using hydrofluoric acid or the like, but the method is not particularly limited thereto.

End face Processing:

The end faces of the work may have undergone processing such as chamfering. In the case where the work is glass, it is preferable that the processing generally called R-chamfering or C-chamfering is conducted by mechanical grinding. However, the processing may be conducted by etching or another technique, and the end face processing is not particularly limited. A glass member may be subjected beforehand to end face processing and then to a heat treatment to obtain a glass article.

Strengthening:

As a method for forming a surface compression stress layer in the work, use can be made of physical strengthening or chemical strengthening. The work in which the main glass surface has been strengthened has enhanced mechanical strength. In this configuration, either of the strengthening methods may be employed. However, chemical strengthening is preferred in the case of obtaining a glass having a small thickness and a large value of surface compression stress (CS).

It is preferred to conduct a strengthening step after the glass article takeout (S3).

Chemical Strengthening:

The chemical strengthening is a treatment in which alkali metal ions having a small ionic radius (typically, Li ions or Na ions) present in at least one main surface of the glass as a work are replaced with alkali ions having a larger ionic radius (typically, Na ions for replacing Li ions, or K ions for replacing Na ions) using a molten salt having a temperature a little lower than 450° C., thereby forming a surface compression stress layer in the glass surface. The chemical strengthening can be conducted by a conventionally known method, and a general method is to immerse the glass in molten potassium nitrate. Potassium carbonate may be added in an amount of about 10% by mass to the molten salt to be used. Use of this molten salt can remove cracks and other defects present in the surface layers of the glass, thereby giving a high-strength glass. In cases when a silver ingredient such as silver nitrate is added to the potassium nitrate for the chemical strengthening, the glass undergoes ion exchange to come to have silver ions in the surfaces.

Thus, antibacterial properties can be imparted. Besides being performed once, the chemical strengthening may be performed two or more times, for example, under different sets of conditions.

A surface compression stress layer is formed on at least one main surface of the work, and the surface compression stress (CS) thereof is preferably 500 MPa or higher, more preferably 550 MPa or higher, even more preferably 600 MPa or higher, especially preferably 700 MPa or higher. As the surface compression stress (CS) thereof increases, the mechanical strength of the strengthened glass increases. Meanwhile, in case where the surface compression stress (CS) thereof is too high, the glass has exceedingly high internal tensile stress. Consequently, the surface compression stress (CS) thereof is preferably 1,800 MPa or less, more preferably 1,500 MPa or less, even more preferably 1,200 MPa or less.

The depth of the surface compression stress layer (DOL) formed on the main surface of the work is preferably 5 μm or larger, more preferably 8 μm or larger, even more preferably 10 μm or larger. Meanwhile, too large values of DOL result in exceedingly high tensile stress in the glass. The depth of the surface compression stress layer (DOL) is hence preferably 70 μm or less, more preferably 50 μm or less, even more preferably 40 μm or less, typically 30 μm or less.

The surface compression stress (CS) of the surface compression stress layer formed on at least one main surface of the work and the depth thereof (DOL) are determined by examining the surface with a surface stress meter (FSM-6000, manufactured by Orihara Industrial Co., Ltd.) and determining the number of interference fringes and the distances therebetween. As an illuminant for the FSM-6000, use is made, for example, of one having a wavelength of 589 nm or 790 nm. The surface compression stress can be determined also by using birefringence. In the case where optical evaluation is difficult, estimation can be made by using evaluation of mechanical properties, e.g., three-point bending. Meanwhile, the tensile stress (CT; unit, MPa) formed in the work can be calculated using the following equation from the surface compression stress (CS; unit, MPa) and depth of the surface compression stress layer (DOL; unit, μm) determined above.

$$CT=\{CS\times(DOL\times10^{-3})\}/\{t-2\times(DOL\times10^{-3})\}$$

Symbol t (unit, mm) is the sheet thickness of the glass.

After the strengthening treatment, the work may be cleaned. For example, not only water washing but also an acid treatment, an alkali treatment, and an alkali brush washing may be conducted as the cleaning.

Functional-Layer Treatment:

Various functional layers may be formed on the work according to need. Examples of the functional layers include an antireflection treatment layer and an antifouling treatment layer. These layers may be formed in combination. Such functional layers may be formed on either the first main surface or the second main surface of the work. It is preferable that such functional layers are formed on the glass article 10 obtained, more preferably after the strengthening step. In the case of a glass article 10 having a functional layer, the protrusion diameter, the surface roughness such as Ssk and Ra, the 60° specular gloss, and the like can be values measured by examining the outermost layer of the glass article 10.

Antireflection Treatment Layer:

The antireflection treatment layer is a layer which has the effect of lowering reflectance to reduce the glare due to light reflection in the surface and which, when used in a display device, can improve the transmittance of light emitted from the display device, thereby improving the visibility of images in the display device.

In the case where the antireflection treatment layer is an antireflection film, it is preferred to form the antireflection film on the first main surface or second main surface of the work. However, where the film is formed is not limited. The configuration of the antireflection film is not limited so long as light reflection can be inhibited. For example, the antireflection film may be configured of superposed layers including a high-refractive-index layer and a low-refractive index layer which have refractive indexes at 550-nm wavelength of 1.9 or higher and 1.6 or less, respectively, or may have a configuration including a layer which has hollow particles or voids dispersed in the film matrix and which has a refractive index at 550-nm wavelength of 1.2-1.4.

Antifouling Treatment Layer:

The antifouling treatment layer is a layer which inhibits organic substances and inorganic substances from adhering or which, when organic or inorganic substances have adhered, shows the effect of rendering the adherent substances easily removable by cleaning, e.g., wiping.

In the case where the antifouling treatment layer is formed as an antifouling film, it is preferred to form the antifouling film on the uppermost surface treatment layer formed over the first main surface or second main surface of the work. The antifouling treatment layer is not limited so long as antifouling properties can be imparted. It is, however, preferable that the antifouling treatment layer is a fluorine-containing organosilicon compound coating film obtained by subjecting a fluorine-containing organosilicon compound to a hydrolytic condensation reaction.

Formation of Printed Layer:

A printed layer may be formed from any of various inks (printing materials) by any of various printing methods, in accordance with applications. Usable printing methods are, for example, spray printing, ink-jet printing, and screen printing. With these printing methods, even a work having a large area can be satisfactorily printed. In particular, ink-jet printing has advantages in that printing on works having a curved portion is easy and it is easy to regulate the surface roughness of the printed surface. Meanwhile, screen printing has an advantage in that it is easy to form a desired printed pattern on a large work so as to result in an even thickness. Although a plurality of inks may be used, it is preferred to use the same ink from the standpoint of adhesion of the printed layers. The ink to be used for forming printed layers may be an inorganic ink or an organic ink.

EXAMPLES

Examples according to the present invention are given below. A-1, A-2, B-1, B-2, C-1, and C-2 are Working Examples, and A-3, B-3, and C-3 are Comparative Examples. The present invention is not limited to the following Examples.

Preparation of Sheet:

As a glass substrate was used a square flat glass (Dragontrail (registered trademark), manufactured by AGC Inc.) having a thickness of 0.7 mm and main-surface dimensions of 300 mm×300 mm. Hereinafter, one of the main surfaces of this glass substrate is referred to as "first main surface", and the other is referred to as "second main surface".

The glass substrate was subjected to (1) Formation of Rugged Layer and (2) Grinding of End faces, thereby producing a glass member.

Glass Member:

(1) Formation of Rugged Layer

A rugged layer was formed in the first main surface of the glass substrate by frosting in the following manner.

First, an acid-resistant protective film (hereinafter referred to simply as "protective film") was applied to the main surface (second main surface) of the glass substrate which was on the side where the rugged layer is not to be formed. This glass substrate was immersed in 3% by mass aqueous hydrogen fluoride solution to etch the glass substrate, thereby removing fouling substances adherent to the first main surface. Subsequently, the glass substrate was immersed in a mixed aqueous solution of 15% by mass hydrogen fluoride and 15% by mass potassium fluoride to frost the first main surface. Thereafter, the glass substrate was immersed in 10% by mass aqueous hydrogen fluoride solution to thereby form a rugged layer so that the fluorides remained on the first main surface. Thus, a glass member having the rugged layer was obtained, in which the glass member at the center portion in the cross section along the thickness direction had a glass transition point Tg of 593° C. and the rugged layer had a glass transition point Tg of 583-586° C. The glass member for each of A-1 to C-3 was prepared so as to have the haze value and gloss value shown in Table 1.

(2) Grinding of End Faces

The glass member was cut into a size of 50 mm×50 mm. Thereafter, the whole periphery of each glass member was subjected to C-chamfering with arrangement of 0.2 mm from the end face. The chamfering was conducted using a #600 grindstone (manufactured by Tokyo Diamond Co., Ltd.) under the conditions of a grindstone rotation speed of 6,500 rpm and a grindstone travelling speed of 5,000 mm/min. This chamfering resulted in an end face roughness of 450 nm.

The glass members obtained were each placed (3) on a forming die and subjected to (4) preheating, deformation, and cooling to produce a glass article.

Glass Articles:

(3) Placement

A heating device 2A as shown in FIG. 11 was used. The basal die 22A had a design-bearing surface for forming a flat portion having a radius of curvature of 10,000 mm or larger. The material of the basal die 22A was carbon. As shown in FIG. 11, each of the glass members of A-1 to C-3 shown in Table 1 was placed so that the second main surface faced downward. A-1 to A-3 were called series A, B-1 to B-3 were called series B, and C-1 to C-3 were called series C. In the test which will be described layer, the Working Examples in each series were compared with the Comparative Example therein.

(4) Preheating/Deformation/Cooling

After the placement, each glass member and the forming die were subjected together to preheating, deformation, and cooling. In the preheating, the glass member was heated from room temperature to a desired temperature. In the deformation, the glass member was held at the desired temperature. In the cooling, the glass member was cooled to an annealing temperature and then allowed to cool to room temperature. The temperature conditions and time conditions for each glass member were as shown in Table 1. The step of deformation was conducted at 680° C. so as to result in an equilibrium viscosity of about $10^9$ Pa·s. Thereafter, the glass member was cooled to room temperature. The glass members of A-1 to C-3 were processed under the conditions shown in Table 1, and glass articles each having an antiglare layer were produced from the glass members of A-1, A-2, B-1, B-2, C-1, and C-2. The temperature conditions were controlled with respect to the first main surface.

TABLE 1

| | Before deformation step | | Deformation step conditions | | |
|---|---|---|---|---|---|
| | | Gloss | | | |
| No. | Haze value % | value % | Heating method | Temperature °C. | Time sec. |
| A-1 | 41.3 | 31.2 | radiation heating | 680 | 3600 |
| A-2 | 41.3 | 31.2 | radiation heating | 680 | 7200 |
| A-3 | 41.3 | 31.2 | deformation step was omitted | | |
| B-1 | 7.3 | 107 | radiation heating | 680 | 3600 |
| B-2 | 7.3 | 107 | radiation heating | 680 | 7200 |
| B-3 | 7.3 | 107 | deformation step was omitted | | |
| C-1 | 28.1 | 53 | radiation heating | 680 | 3600 |
| C-2 | 27.9 | 53.1 | radiation heating | 680 | 7200 |
| C-3 | 28.4 | 52.6 | deformation step was omitted | | |

Wear Resistance Test with Sand Paper:

A sand paper was attached to flat metallic indenters having bottom dimensions of 10 mm×10 mm, thereby producing friction blocks for rubbing samples therewith. Next, the friction blocks were used to conduct a wear resistance test with a plane abrasion tester of a triple type (manufactured by Daiei Kagaku Seiki Mfg., Co., Ltd.). Specifically, the indenters were attached to the abrasion tester so that the bottom surfaces thereof were in contact with the rugged layers or antiglare layers of samples. A weight was placed so that a load of 3,000 g was imposed on each of the friction blocks, which were then slidably reciprocated on the samples under the conditions of an average speed of 4,800 mm/min and a stroke of 40 mm. One shuttle movement was regarded as two rubbing motions, and the test was performed until the number of rubbing motions reached 100. The samples thus tested were examined for haze value and gloss value. The samples used were the glass articles of A-1, A-2, B-1, B-2, C-1, and C-2 and the glasses of A-3, B-3, and C-3, which had not undergone the heating.

Figure 12:
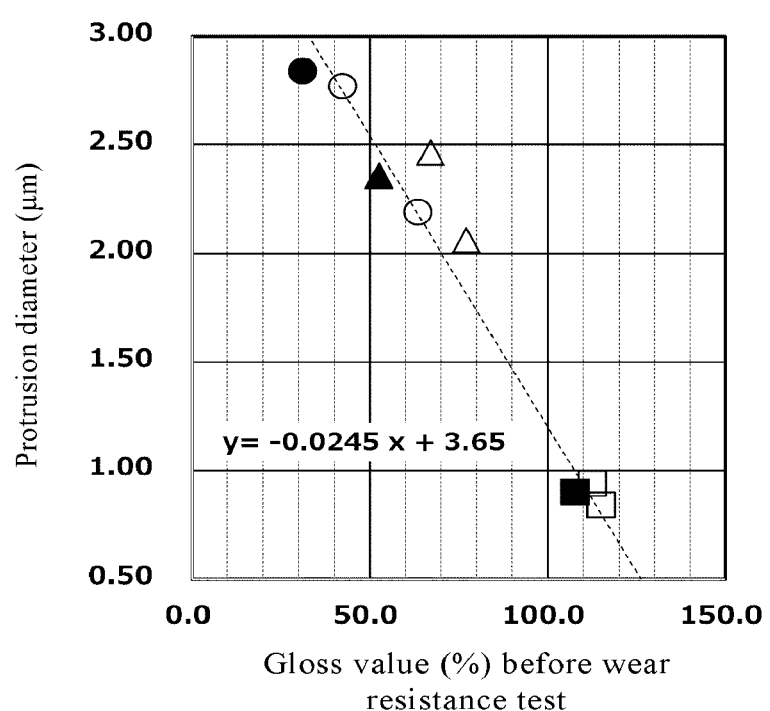
FIG. 12 is a graph showing a relation between gloss value (%) before wear resistance test and protrusion diameter (μm) in glass articles and glass members.

The haze value, gloss value, and surface shape, after the deformation; the haze value and gloss value after the wear resistance test; and the changes in haze value and gloss value through the wear resistance test are shown in Table 2 with respect to each of the glass articles of A-1, A-2, B-1, B-2, C-1, and C-2 and the glasses of A-3, B-3, and C-3. The analytical items for the surface shape were average protrusion diameter, Sa, and Ssk. In FIG. 12 are shown the protrusion diameters and the gloss value before the wear resistance test. In the FIG. 12, plots of circle indicate the series A, plots of square indicate the series B, and plots of triangle indicate the series C. The filled plots indicate Comparative Examples A-3, B-3, and C-3 of each series.

A-1 and A-2 in series A, B-1 and B-2 in series B, and C-1 and C-2 in series C were able to be inhibited from changing in haze value or gloss value through the wear resistance test, and showed excellent wear resistance. Meanwhile, A-3, B-3, and C-3 each showed considerably large changes in haze value and gloss value through the wear resistance test as compared with the other glass articles in the same series, and thus showed poor wear resistance.

In cases when protrusion diameter is expressed by y (μm) and gloss value before the wear resistance test is expressed by x (%), then glass articles satisfying the relation of y>−0.0245x+3.65 are considered to show excellent wear resistance.

Incidentally, A-3, B-3, and C-3, when subjected to the heat treatment, become glass articles such as A-1, A-2, B-1, B-2, C-1, and C-2 to come to have a reduced protrusion diameter. The protrusion diameter is a diameter determined by cutting the "surface obtained by image processing" at a height of [bearing height]±0.01 converting the resultant sections of the protrusions into circles, and averaging the diameters thereof. That the average protrusion diameter has decreased means that the steepness of the fine surface protrusions has been reduced. This is thought to be because the surface recesses and protrusions of the glass article have thermally deformed due to the heat treatment so as to reduce the steepness of the rugged surface shape. As a result, the rugged shape of the glass article surface is thought to have become dense to have improved wear resistance.

As demonstrated above, glass articles which were excellent in terms of visibility, such as antiglare property, and had high wear resistance were obtained according to the present invention.

The present invention has been described in detail with reference to specific embodiments, but it will be apparent to those skilled in the art that various changes and modifications can be made without departing from the spirit and scope of the present invention. The present application is based on Japanese Patent Application (No. 2018-055900) filed on Mar. 23, 2018 and the entirety of which is incorporated by reference.

REFERENCE SIGNS LIST

1 Glass member
10 Glass article
2 Forming device
3 Glass substrate
5 Rugged layer
50 Antiglare layer
7 Flat portion
9 Curved portion

TABLE 2

| | Surface shape after deformation step | | | | | After wear resistance test | | Changes through wear resistance test | |
|---|---|---|---|---|---|---|---|---|---|
| | After deformation step | | Protrusion | | | | | | |
| No. | Haze value % | Gloss value % | diameter μm | Sa nm | Ssk — | Haze value % | Gloss value % | Haze value % | Gloss value % |
| A-1 | 35 | 42.3 | 2.77 | 116.6 | −0.55 | 17.3 | 85.7 | −50.7 | 102.6 |
| A-2 | 26.7 | 63.4 | 2.19 | 89.1 | −0.35 | 13.3 | 99.6 | −50.3 | 57.1 |
| A-3 | — | — | 2.84 | 121.3 | −0.28 | 13.6 | 100.1 | −67.1 | 220.8 |
| B-1 | 7 | 112.6 | 0.94 | 54 | −0.45 | 6.9 | 113.8 | −0.7 | 1.1 |
| B-2 | 5.9 | 115 | 0.84 | 50.6 | −0.13 | 5.8 | 120.8 | −1.9 | 5 |
| B-3 | — | — | 0.9 | 54.4 | −0.39 | 5.9 | 116.7 | −18.6 | 9 |
| C-1 | 22 | 67.1 | 2.46 | 87.6 | −0.38 | 12.8 | 98.7 | −41.7 | 47.1 |
| C-2 | 18.1 | 77.2 | 2.06 | 80 | −0.23 | 11.8 | 100.1 | −34.6 | 29.7 |
| C-3 | — | — | 2.36 | 90 | −0.53 | 12.1 | 105.9 | −57.3 | 101.3 |

What is claimed is:

1. A glass article comprising a first main surface, a second main surface, and an end face, wherein:
   the glass article comprises an antiglare layer on the first main surface side;
   the antiglare layer has a glass transition point Tg of equal to or less than a glass transition point $Tg_0$ of the glass article at a center portion in a cross section along a thickness direction; and
   the first main surface has a protrusion diameter y (μm) that satisfies the relation (1) with respect to a 60° specular gloss (gloss value) x (%) of the first main surface, $$y > -0.0245x + 3.65 \qquad (1)$$

wherein the protrusion diameter y (μm) is determined by examining the first main surface with a laser microscope to obtain an XYZ data of a surface shape, obtaining an image from the XYZ data, subjecting the obtained image to a filtering with an image processing software to acquire a smoothed image, subtracting an XYZ data of the smoothed image from the XYZ data of the surface shape to obtain a profile, cutting the profile at a height of a bearing height+0.01 μm, converting a resultant protrusion section into a circle, and taking the diameter of the circle as the protrusion diameter y, and
   the 60° specular gloss (gloss value) x (%) is a value measured by the method described in JIS Z8741:1997 (ISO 2813:1994).

2. The glass article according to claim 1, wherein at least one of the first main surface and the second main surface comprises a curved portion.

3. The glass article according to claim 1, having a ratio $Z_1/Z_0$ of 0.9-1.1, wherein Z is an atomic composition ratio of X/Si between Si and an element X selected from the group consisting of Al, B, Zr, and Ti, $Z_1$ is the atomic composition ratio Z in the antiglare layer, and $Z_0$ is the atomic composition ratio Z in the glass article at the center portion in the cross section along the thickness direction.

4. The glass article according to claim 1, having an alkali metal composition ratio represented by K/(Li+Na+K) in the antiglare layer being larger than an alkali metal composition ratio in the glass article at the center portion in the cross section along the thickness direction.

5. The glass article according to claim 1, wherein the antiglare layer comprises a fluorine atom (F) or a chlorine atom (Cl).

6. The glass article according to claim 1, wherein the 60° specular gloss (gloss value) x (%) is 15% or more and 130% or less.

7. The glass article according to claim 1, comprising an aluminosilicate glass.

8. The glass article according to claim 1, wherein the protrusion diameter y (μm) is 1.5 μm or more and 3.0 μm or less.

9. The glass article according to claim 1, wherein the first main surface has a surface skewness Ssk of less than 0.

10. The glass article according to claim 1, having a haze value of 0.1% or more and 50% or less.

11. The glass article according to claim 10, having an in-plane standard deviation of the haze value of 0-10%.

12. The glass article according to claim 1, wherein at least one of the first main surface and the second main surface comprises a surface compression stress layer having a surface compression stress (CS) of 500 MPa or higher.

13. The glass article according to claim 1, wherein the first main surface further comprises a functional layer.

14. The glass article according to claim 13, wherein the functional layer is an antireflection treatment layer.

15. The glass article according to claim 13, wherein the functional layer is an antifouling treatment layer.

* * * * *